(12) United States Patent
Smith et al.

(10) Patent No.: US 11,311,005 B2
(45) Date of Patent: Apr. 26, 2022

(54) HEATED INSECT TRAPPING DEVICE AND METHODS THEREOF

(71) Applicant: The Procter & Gamble Company, Cincinnati, OH (US)

(72) Inventors: Christopher Lawrence Smith, Liberty Township, OH (US); Joaquin Antonio Crespo, Mason, OH (US); Brigitte Harttmann, Niedernhausen (DE); Stefan H. Hollinger, Kronberg (DE); Walter Sordo, Trento (IT); Danilo Rossi, Trento (IT); Andrea Pedrotti, Cavedine (IT)

(73) Assignee: The Procter & Gamble Company, Cincinnati, OH (US)

( * ) Notice: Subject to any disclaimer, the term of this patent is extended or adjusted under 35 U.S.C. 154(b) by 381 days.

(21) Appl. No.: 16/244,866

(22) Filed: Jan. 10, 2019

(65) Prior Publication Data

US 2019/0141978 A1    May 16, 2019

Related U.S. Application Data

(63) Continuation of application No. PCT/US2016/041811, filed on Jul. 11, 2016.

(51) Int. Cl.
   *A01M 1/14*     (2006.01)
   *A01M 1/02*     (2006.01)
(52) U.S. Cl.
   CPC .............. *A01M 1/145* (2013.01); *A01M 1/02* (2013.01); *A01M 1/023* (2013.01)

(58) Field of Classification Search
   CPC .......... A01M 1/04; A01M 1/08; A01M 1/145; A01M 1/16
   See application file for complete search history.

(56) References Cited

U.S. PATENT DOCUMENTS

| | | | |
|---|---|---|---|
| 2,931,880 A * | 4/1960 | Yaffe | F24H 1/00 392/390 |
| 2,942,090 A | 6/1960 | Diehl | |
| 4,654,998 A * | 4/1987 | Clay | A01M 1/145 43/113 |
| 4,876,822 A | 10/1989 | White | |
| 4,951,414 A | 8/1990 | Mewissen | |

(Continued)

FOREIGN PATENT DOCUMENTS

| | | |
|---|---|---|
| BR | 9400882 A | 10/1995 |
| CN | 2093515 U | 1/1992 |

(Continued)

OTHER PUBLICATIONS

International Search Report and Written Opinion; Application Ser. No. PCT/US2017/039381; dated Nov. 27, 2017, 19 pages.

(Continued)

*Primary Examiner* — Peter M Poon
*Assistant Examiner* — Morgan T Barlow
(74) *Attorney, Agent, or Firm* — Melissa Krasovec

(57) ABSTRACT

An insect trapping device includes a base with a shroud and a cartridge. The cartridge includes an adhesive portion that is positioned adjacent the shroud, when the cartridge is attached to the base. The shroud includes an electric heating element, which heats the shroud and the adhesive portion of the cartridge.

12 Claims, 29 Drawing Sheets

(56) References Cited

U.S. PATENT DOCUMENTS

| | | | |
|---|---|---|---|
| 4,953,320 A * | 9/1990 | Nelson | A01M 1/02 43/121 |
| 5,044,112 A | 9/1991 | Williams | |
| 5,099,598 A * | 3/1992 | Carter | A01M 1/2011 43/121 |
| 5,142,815 A | 9/1992 | Birdsong | |
| 5,251,397 A | 10/1993 | Exum et al. | |
| 5,311,697 A * | 5/1994 | Cavanaugh | A01M 1/08 43/107 |
| 5,335,445 A | 8/1994 | Kuepper | |
| 5,365,690 A | 11/1994 | Nelson et al. | |
| D357,725 S | 4/1995 | Biasetti | |
| 5,651,211 A * | 7/1997 | Regan | A01M 1/145 43/113 |
| 5,657,576 A * | 8/1997 | Nicosia | A01M 1/023 43/107 |
| 5,759,561 A * | 6/1998 | Angst | A01N 25/18 424/405 |
| 5,799,436 A * | 9/1998 | Nolen | A01M 1/023 43/112 |
| 5,915,948 A * | 6/1999 | Kunze | A01M 1/145 43/114 |
| 5,974,727 A | 11/1999 | Gilbert | |
| 6,055,766 A * | 5/2000 | Nolen | A01M 1/023 43/112 |
| 6,108,965 A * | 8/2000 | Burrows | A01M 1/145 43/113 |
| 6,392,549 B1 * | 5/2002 | Wu | A01M 1/2077 340/384.2 |
| 6,393,759 B1 * | 5/2002 | Brown | A01M 1/023 43/113 |
| 6,397,515 B1 | 6/2002 | Brown et al. | |
| 6,478,440 B1 | 11/2002 | Jaworski | |
| 6,493,986 B1 | 12/2002 | Nelson et al. | |
| 6,560,919 B2 * | 5/2003 | Burrows | A01M 1/145 43/107 |
| 6,618,983 B1 | 9/2003 | Spragins | |
| 6,655,078 B2 * | 12/2003 | Winner | A01M 1/023 43/114 |
| 6,718,687 B2 * | 4/2004 | Robison | A01M 1/145 43/114 |
| 6,871,443 B2 * | 3/2005 | Lambert | A01M 1/145 43/113 |
| 6,886,292 B2 * | 5/2005 | Studer | A01M 1/026 43/112 |
| 7,096,621 B2 * | 8/2006 | Nelson | A01M 1/145 43/113 |
| 7,191,560 B2 * | 3/2007 | Harris | A01M 1/02 43/107 |
| 8,104,223 B1 | 1/2012 | Rodriguez | |
| 8,109,036 B1 * | 2/2012 | Wilbanks | A01M 1/06 43/112 |
| 8,291,638 B2 | 10/2012 | Larsen | |
| 8,375,625 B2 * | 2/2013 | Larsen | A01M 1/145 43/113 |
| 8,402,691 B2 * | 3/2013 | Coventry | A01M 1/06 43/139 |
| 8,572,890 B1 * | 11/2013 | Lark | A01M 1/04 43/113 |
| 8,701,335 B2 | 4/2014 | Larsen | |
| 8,707,614 B2 * | 4/2014 | Larsen | A01M 1/145 43/113 |
| 8,740,110 B2 * | 6/2014 | Gruenbacher | A61L 9/127 239/34 |
| 8,793,928 B2 * | 8/2014 | Larsen | A01M 1/145 43/113 |
| 8,852,501 B2 * | 10/2014 | Hedman | A01M 21/04 422/22 |
| 9,089,121 B2 * | 7/2015 | Diclaro, II | A01M 1/02 |
| D736,341 S | 8/2015 | Lieberwirth et al. | |
| D780,284 S | 2/2017 | Lieberwirth | |
| D780,285 S | 2/2017 | Lieberwirth | |
| 10,021,869 B1 * | 7/2018 | Cogley | A01M 1/145 |
| D829,302 S | 9/2018 | Rocha et al. | |
| 10,143,191 B2 | 12/2018 | Studer et al. | |
| D849,878 S | 5/2019 | Lieberwirth | |
| D850,572 S | 6/2019 | Lieberwirth | |
| 10,327,435 B2 | 6/2019 | Studer et al. | |
| 10,561,135 B2 | 2/2020 | Sandford | |
| 10,568,314 B2 | 2/2020 | Sandford | |
| 10,588,307 B2 | 3/2020 | Sandford | |
| D890,291 S | 7/2020 | Rocha et al. | |
| 2001/0042337 A1 * | 11/2001 | Lambert | A01M 1/145 43/113 |
| 2002/0032980 A1 * | 3/2002 | Nelson | A01M 1/145 43/113 |
| 2002/0078620 A1 | 6/2002 | Nelson et al. | |
| 2002/0139040 A1 * | 10/2002 | Burrows | A01M 1/145 43/113 |
| 2003/0154644 A1 * | 8/2003 | Lambert | A01M 1/145 43/107 |
| 2004/0139648 A1 * | 7/2004 | Durand | A01M 1/06 43/139 |
| 2004/0200129 A1 * | 10/2004 | Studer | A01M 1/026 43/113 |
| 2004/0237381 A1 * | 12/2004 | Durand | A01M 1/023 43/139 |
| 2004/0237382 A1 * | 12/2004 | Durand | A01M 5/00 43/139 |
| 2005/0220828 A1 | 10/2005 | Ullom et al. | |
| 2006/0080888 A1 * | 4/2006 | Greening | A01M 1/145 43/113 |
| 2006/0107583 A1 | 5/2006 | Wu | |
| 2006/0150472 A1 * | 7/2006 | Harris | A01M 1/14 43/113 |
| 2006/0237439 A1 * | 10/2006 | Norwood | A01M 1/2061 219/506 |
| 2008/0134568 A1 | 6/2008 | Cowan et al. | |
| 2008/0236028 A1 * | 10/2008 | McBride | A01M 1/023 43/139 |
| 2009/0100743 A1 * | 4/2009 | Prater | A01M 1/223 43/112 |
| 2009/0288333 A1 | 11/2009 | Johnston et al. | |
| 2010/0024278 A1 | 2/2010 | Simchoni-barak | |
| 2010/0071254 A1 * | 3/2010 | Calkins | A01M 1/145 43/107 |
| 2010/0263260 A1 * | 10/2010 | Engelbrecht | A01M 1/14 43/113 |
| 2013/0180161 A1 * | 7/2013 | Vasudeva | A01M 1/023 43/114 |
| 2013/0312314 A1 * | 11/2013 | Greening | A01M 1/023 43/114 |
| 2016/0000060 A1 * | 1/2016 | Sandford | A01M 1/145 43/113 |
| 2016/0262367 A1 * | 9/2016 | Sandford | A01M 1/145 |
| 2016/0345569 A1 | 12/2016 | Freudenberg et al. | |
| 2017/0035039 A1 * | 2/2017 | Sandford | A01M 1/145 |
| 2017/0303523 A1 * | 10/2017 | Sandford | F21S 8/035 |
| 2018/0184635 A1 | 7/2018 | Studer et al. | |
| 2018/0199562 A1 | 7/2018 | Willcox et al. | |
| 2018/0235202 A1 | 8/2018 | Sandford et al. | |
| 2018/0310543 A1 | 11/2018 | Holmes | |
| 2018/0368385 A1 | 12/2018 | Gilbert, II | |
| 2019/0008133 A1 * | 1/2019 | Llorente Alonso | A01M 1/145 |
| 2019/0045771 A1 * | 2/2019 | Rocha | A01M 1/145 |
| 2019/0133105 A1 | 5/2019 | Leach et al. | |
| 2019/0141977 A1 * | 5/2019 | Smith | F16B 1/0071 43/113 |
| 2019/0141979 A1 | 5/2019 | Smith | |
| 2019/0174736 A1 | 6/2019 | Smith | |
| 2019/0261616 A1 | 8/2019 | Studer et al. | |
| 2019/0350184 A1 | 11/2019 | Chang et al. | |
| 2019/0357516 A1 | 11/2019 | Chang et al. | |
| 2020/0113165 A1 | 4/2020 | Sandford et al. | |
| 2020/0138004 A1 | 5/2020 | Sandford et al. | |
| 2020/0138005 A1 | 5/2020 | Sandford et al. | |
| 2020/0138006 A1 * | 5/2020 | Sandford | A01M 1/145 |
| 2020/0146273 A1 | 5/2020 | Chang et al. | |
| 2020/0214279 A1 | 7/2020 | Tsai et al. | |

(56) References Cited

U.S. PATENT DOCUMENTS

| | | | |
|---|---|---|---|
| 2020/0214280 A1 | 7/2020 | Sandford et al. | |
| 2020/0245606 A1* | 8/2020 | Rocha | A01M 1/145 |
| 2021/0105991 A1* | 4/2021 | Furner | A01M 1/165 |

FOREIGN PATENT DOCUMENTS

| | | | | |
|---|---|---|---|---|
| CN | 2449483 Y | 9/2001 | | |
| CN | 203884503 U | 10/2014 | | |
| CN | 204032139 U | 12/2014 | | |
| DE | 3225412 A1 | 1/1984 | | |
| DE | 8802934 U1 | 5/1988 | | |
| DE | 29816743 U1 | 1/1999 | | |
| EP | 0659339 A3 | 3/1997 | | |
| GB | 2173103 A * | 10/1986 | | A61L 9/03 |
| GB | 2433690 A * | 7/2007 | | A01M 1/08 |
| JP | H06245676 A | 9/1994 | | |
| JP | H10229801 A | 9/1998 | | |
| JP | H11146751 A | 6/1999 | | |
| JP | H11346629 A | 12/1999 | | |
| JP | 2005095149 A | 4/2005 | | |
| JP | 2006211923 A | 8/2006 | | |
| KR | 20130049475 A | 5/2013 | | |
| KR | 20150112755 A | 10/2015 | | |
| WO | 8200567 A1 | 3/1982 | | |
| WO | WO-9524934 A1 * | 9/1995 | | H05B 3/26 |
| WO | 9615664 A1 | 5/1996 | | |
| WO | 9934671 A1 | 7/1999 | | |
| WO | 0003588 A1 | 1/2000 | | |
| WO | WO-0168154 A1 * | 9/2001 | | F21V 23/0442 |
| WO | 2005053389 A1 | 6/2005 | | |
| WO | WO2008096352 A2 | 8/2008 | | |
| WO | WO2015081033 A1 | 6/2015 | | |
| WO | WO2015164849 A1 | 10/2015 | | |
| WO | 2018025426 A1 | 2/2018 | | |
| WO | 2020136173 A1 | 7/2020 | | |

OTHER PUBLICATIONS

Unpublished U.S. Appl. No. 29/685,836, filed Apr. 1, 2019, to first inventor et. al.
Unpublished U.S. Appl. No. 29/685,834, filed Apr. 1, 2019, to first inventor et. al.
U.S. Appl. No. 16/244,355, filed Jan. 14, 2019, Smith, et al.
Case 14381 Search Report; dated Jun. 6, 2017; PCT/us2016/041812; 15 Pages.
Case 14382Q Search Report; PCT/US2016/041811; dated Apr. 10, 2017; 14 pages.

* cited by examiner

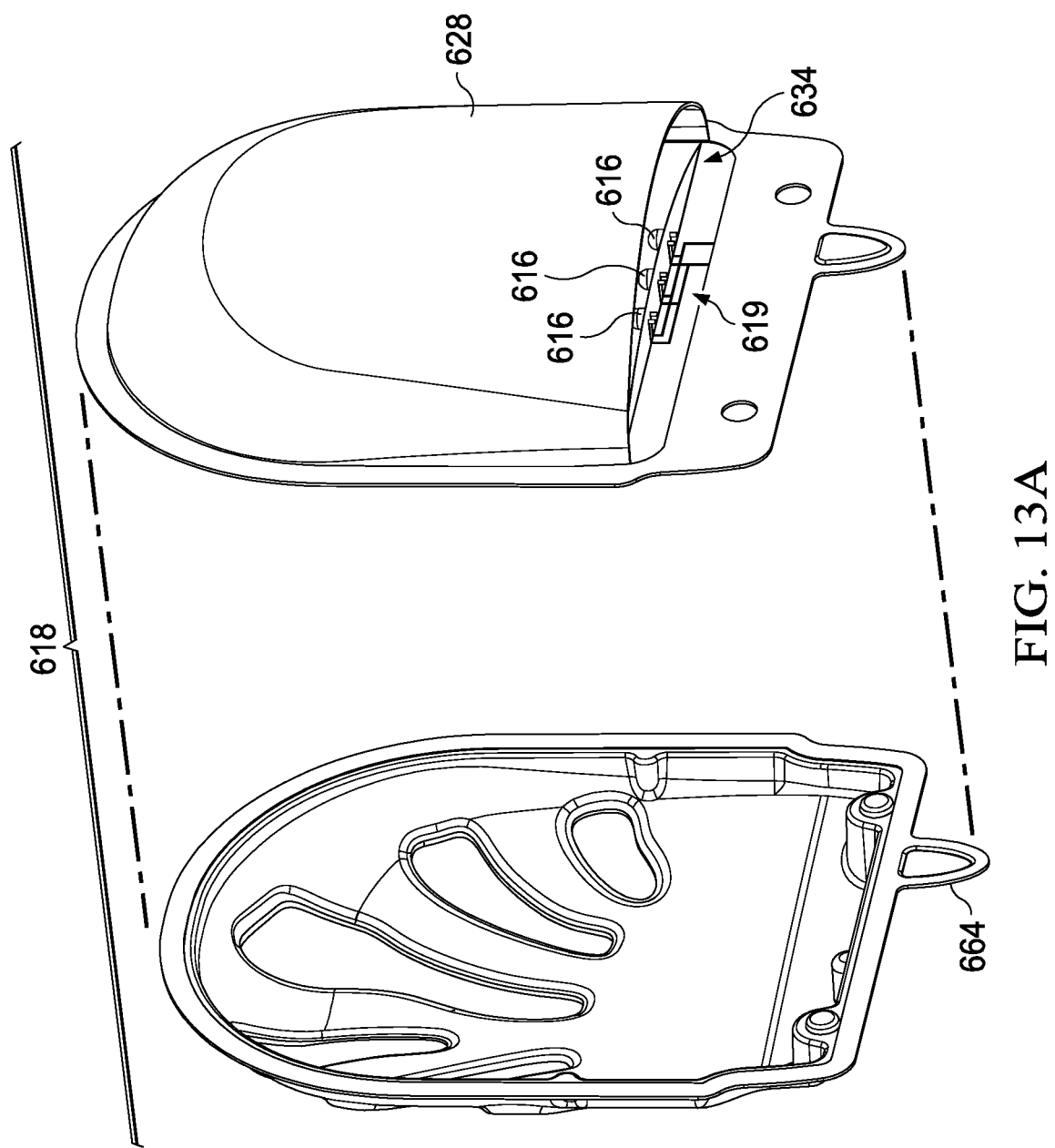

HEATED INSECT TRAPPING DEVICE AND METHODS THEREOF

TECHNICAL FIELD

The present disclosure generally relates to insect trapping devices, and more specifically to portable insect trapping devices having heated components.

BACKGROUND

Historically, a variety of pest control devices have been employed to trap insects and other pests. With recent outbreaks of various diseases, infections, and other health risks that are spread by insects, the need for pest control devices has only increased. Such pest control devices typically employ an attraction mechanism for luring pests to the pest control device. Example attraction mechanisms include baits such as food, light, heat, pheromones, or other odorous materials found attractive by the pest. Some pest control devices have historically included an immobilization mechanism to prevent the pest from exiting the pest control device. One type of immobilization mechanism used is a substrate such as a board, paper or other medium having a surface coated with an adhesive. Pests attracted to the pest control device or incidentally coming into contact with the adhesive become trapped by adhesion.

For some consumers, it is desirable to have a pest control device that is capable of simultaneously attracting and capturing a wide variety of flying insects, including mosquitoes, flies, moths, and so forth. However, mosquitoes can be particularly dangerous. Certain species of mosquitoes are known carriers of a number of diseases, including malaria, dengue fever, yellow fever, the west nile virus and the zika virus. Of these diseases, malaria has been described by some as the "most prevalent and most pernicious disease of humans". White, N., Antimalarial Drug Resistance, The Journal of Clinical Investigation, Vol. 113, no. 8 (2004). As of 2010, the World Health Organization estimated that 219 million cases of malaria and 660,000 deaths occurred. Daniel, J., Drug Resistant Malaria—A Generation of Progress in Jeopardy, Center for Strategic & International Studies (2013). Tragically, malaria is the third leading cause of death for children under the age of 5, claiming more 50 lives every hour. Id. Some mosquito species believed to be carriers of human disease, such as *Aedes Aegypti, Aedes Albopictus, Aedes Canadensis, Anopheles Gambiae, Anopheles Fenustus, Culex Annulirotris, Culex Annulus* and *Culex Pipiens.*

Heat is a known attractant for mosquitoes. See, e.g., Maekawa et al., The role of proboscis of the malaria vector mosquito *Anopheles stephensi* in host-seeking behavior, Parasites and Vectors, 4:10 (2011). Greppi et al. observed that "mosquitoes were strongly attracted to a target when heated above ambient, but only up to ~50° C. When it got hotter, this attraction declined strongly." Greppi et al., Some like it hot, but not too hot, eLife 4:e12838 (2015). See, also, Corfas et al., The cation channel TRPA1 tunes mosquito thermotaxis to host temperatures, eLife 4:e11750 (2015). Mosquitoes and other insects can also be attracted to light sources. See, e.g., Burkett et al., Laboratory evaluation of colored light as an attractant for female *aedes agypti, aedes albopictus, anopheles quadrimaculatus* and *culex nigripalpus,* The Florida Entomologist, Vol. 88, No. 4 (2005).

Insect trapping devices that combine an adhesive for trapping insects together with light and heat are known, some examples being described in PCT patent publication WO 2015/164,849. However, there are opportunities for improvement. Indeed, it would be advantageous to provide an insect trapping device that provides improved techniques for achieving the desired temperature of the adhesive for attracting insects, particularly mosquitoes. It would further be advantageous to provide an insect trapping device that provides improved techniques for avoiding hot spots detectable by mosquitoes, such as on the adhesive and/or the device interior or exterior, which might otherwise lead to a decrease in attraction. It would further be advantageous to provide an insect trapping device that provides a heater that is reliable, simple to manufacture, and uses only a few parts. It would still further be advantageous to provide an insect trapping device that combines one or more of the foregoing advantages with techniques that improve the distribution of light through an adhesive for attracting a variety of insects to the adhesive. While numerous opportunities for improvement are described above, it will be appreciated that the disclosure hereafter is not limited to devices that provide any or all such improvements.

SUMMARY

The present disclosure fulfills one or more of the needs described above by, in one embodiment, an insect trapping device comprising a base comprising an upstanding shroud having a front surface. The shroud has disposed therein an electric heating element for heating the front surface of the shroud. The insect trapping device further comprises a cartridge releaseably engaging the base, the cartridge defining an opening for receiving a flying or crawling insect and a bottom opening through which the shroud passes when the cartridge engages the base, and the cartridge comprising an adhesive portion for trapping the insect. The adhesive portion has a front face and a rear face. The insect trapping device further comprises a light source positioned external to the shroud producing light that illuminates at least a portion of the front surface of the shroud and at least a portion of the rear face of the adhesive portion when the cartridge engages the base. At least a portion of the light illuminating the portion of the front surface is reflected by the front surface toward the rear face of the adhesive portion.

In another embodiment, an insect trapping device comprises a base comprising an upstanding electric heating element and a cartridge releaseably engaging the base. The cartridge has a front surface defining an opening for receiving a flying or crawling insect and a bottom opening through which the electric heating element passes when the cartridge engages the base. The cartridge comprises an adhesive portion for trapping the insect. A light source is disposed between the upstanding electric heating element and the adhesive portion when cartridge engages the base.

In another embodiment, an insect trapping device comprises a base and a cartridge comprising a shell and an insert having an adhesive portion. The cartridge releaseably engages the base and the insert is releaseably retained at least partially within the shell. The shell comprises a shroud having disposed therein an electric heating element. A light source is positioned to illuminate at least a portion of the front surface of the shroud and at least a portion of the rear face of the adhesive portion when the insert is seated within the shell.

In another embodiment, an insect trapping cartridge comprises a shell comprising a front surface defining an opening for receiving a flying or crawling insect, a rear surface, a top surface, side surfaces and an opening in a bottom of the shell. The cartridge further comprises an insert having an adhesive portion. The insert is releaseably retained at least partially within the shell and the shell comprises a shroud having disposed therein an electric heating element. The insert drops out of the shell through the opening in the bottom in response to a user applying a force to one or more of the front surface, the rear surface, the top surface or one or more of the side surfaces.

In another embodiment, an insect trapping device comprises a base comprising an upstanding shroud having a front surface, the shroud having disposed therein an electric heating element for heating the front surface of the shroud. The insect trapping device further comprises a cartridge releaseably engaging the base, the cartridge defining an opening for receiving a flying or crawling insect and a bottom opening through which the shroud passes when the cartridge engages the base. The cartridge comprises an adhesive portion for trapping the insect. The adhesive portion has a front face and a rear face, wherein side edges of the shroud are closer to the adhesive portion than a geometric center of the shroud is to the adhesive portion when the cartridge engages the base. A light source positioned to illuminate at least a portion of the front surface of the shroud and at least a portion of the rear face of the adhesive portion when the cartridge engages the base.

In another embodiment, an insect trapping device comprises base comprising an upstanding shroud having a front surface, the shroud having disposed therein an electric heating element for heating the front surface of the shroud. The insect trapping device further comprises cartridge releaseably engaging the base, the cartridge defining an opening for receiving a flying or crawling insect and a bottom opening through which the shroud passes when the cartridge engages the base, and the cartridge comprising an adhesive portion for trapping the insect, the adhesive portion having a front face and a rear face. The insect trapping device further comprises a light source positioned to illuminate at least a portion of the front surface of the shroud and at least a portion of the rear face of the adhesive portion when the cartridge engages the base, wherein the light that illuminates the portion of the front surface of the shroud is reflected by the portion of the front surface onto the rear face of the adhesive portion.

In another embodiment, an insect trapping device comprises a base comprising an upstanding shroud having an internal cavity and a front surface, the shroud having an electric heating element disposed within the internal cavity for heating the front surface of the shroud. The insect trapping device further comprises a cartridge releaseably engaging the base, the cartridge defining an opening for receiving a flying or crawling insect and a bottom opening through which the shroud passes when the cartridge engages the base, and the cartridge comprising an adhesive portion for trapping the insect, the adhesive portion having a front face and a rear face. The insect trapping device further comprises a light source positioned external to the internal cavity to illuminate at least a portion of the front surface of the shroud and at least a portion of the rear face of the adhesive portion when the cartridge engages the base.

BRIEF DESCRIPTION OF THE DRAWINGS

The above-mentioned and other features and advantages of the present disclosure, and the manner of attaining them, will become more apparent and the disclosure itself will be better understood by reference to the following description of nonlimiting embodiments of the disclosure taken in conjunction with the accompanying drawings, wherein:

FIGS. 13A-13B are isometric exploded views of an example cartridge having a light source;

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION

The present disclosure provides for insect trapping devices, methods of making insect trapping devices, and methods of using insect trapping devices. Various nonlimiting embodiments of the present disclosure will now be described to provide an overall understanding of the principles of the function, design and use of the insect trapping devices disclosed herein. One or more examples of these nonlimiting embodiments are illustrated in the accompanying drawings. Those of ordinary skill in the art will understand that the methods described herein and illustrated in the accompanying drawings are nonlimiting example embodiments and that the scope of the various nonlimiting embodiments of the present disclosure are defined solely by the claims. The features illustrated or described in connection with one nonlimiting embodiment can be combined with the features of other nonlimiting embodiments. Such modifications and variations are intended to be included within the scope of the present disclosure.

Figure 1:
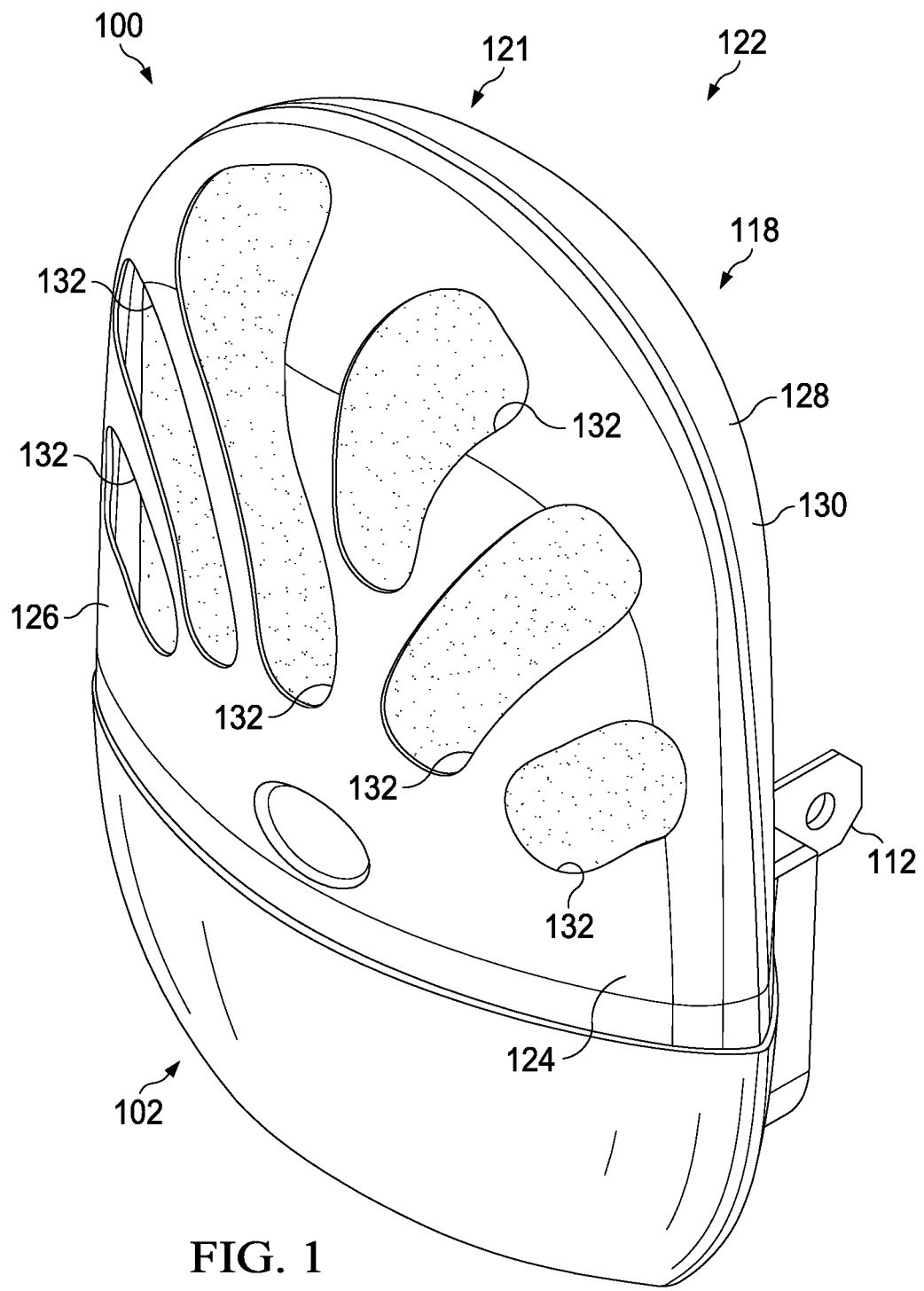
FIG. 1 depicts an example insect trapping device.
Figure 2:
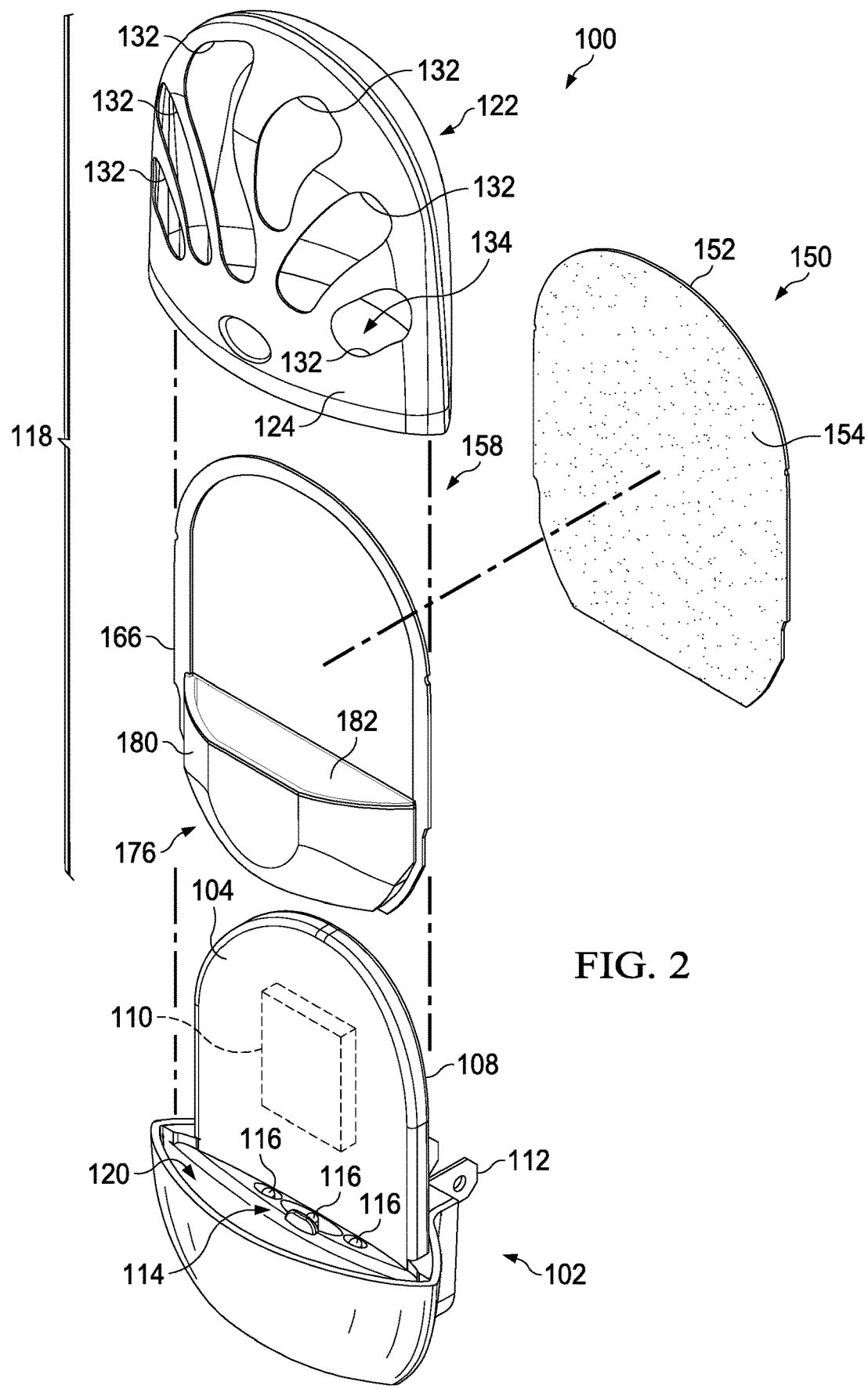
FIG. 2 is an exploded view of the insect trapping device depicted in FIG. 1.

Referring now to FIGS. 1-2, an example insect trapping device 100 in accordance with one non-limiting embodiment is depicted. FIG. 2 is an exploded view of the insect trapping device 100 depicted in FIG. 1. The insect trapping device 100 has a base 102 and a cartridge 118 that can be selectively coupled to the base 102 by a user. The cartridge 118 includes an insert 150 and a shell 122 that is configured to receive the insert 150. As described in more detail below, the insert 150 can include an adhesive portion 152 that immobilizes insects that contact a front face 154 of the adhesive portion 152. The base 102 can include prongs 112 such that the insect trapping device 100 can be plugged into a suitable power source, such as a wall socket. In other configurations the insect trapping device 100 can draw power from an onboard battery or other type of power source (i.e., solar). The insect trapping device 100 can utilize a variety of attractants to draw insects into the device, such as heat, light, chemical composition attractants, and so forth, some of which may require a power source to operate. As such, the power source may be used to energize various onboard components, such has an electric heating element 110, a light source 114, and/or other components which may serve to attract insects to the insect trapping device 100. With regard to the electric heating element 110, a wide variety of heating elements may be utilized. Example electric heating elements include, but are not limited to, metal heating elements, ceramic heating elements, polymeric heating elements, composite heating elements, and/or combinations thereof.

The shell 122 may have front housing 124 that has a front surface 126 and a rear housing 128 that has a rear surface 130. The front housing 124 and the rear housing 128 can be separate pieces that are coupled together to form the shell 122, or the front housing 124 and the rear housing 128 can be a unitary piece which integrally forms the shell 122. The front housing 124 and the rear housing 128 substantially can enclose the adhesive portion 152 of the insert 150 once the insert is seated within the shell 122. Alternatively, in some configurations, an adhesive portion is provided to a user predisposed within the shell, such as illustrated by cartridges 518 and 618, described below.

The front surface 126 may define one or more openings 132 for receiving a flying or crawling insect such that they can come in contact with the front face 154 of the adhesive portion 152 of the insert 150. While FIGS. 1-2 depict one example arrangement of openings 132, it is to be appreciated that the size, arrangement, and number of the one or more openings 132 can vary. The front housing 124 may be convex and spaced apart from the rear housing 128 at the bottom of the shell 122 such that they collectively define a bottom opening 134 (FIG. 2). The bottom of the shell 122 or insert 150 is determined when the shell 122 or insert 150 is oriented as it would be during use by a consumer to attract and capture the insects. The opposing sides of the bottom opening 134 may be tapered, grooved, or otherwise configured to aid in proper alignment of the insert 150 as it is slid into the shell 122 by a user. A top portion 121 of the shell 122 may be substantially or wholly closed (as shown by way of a non-limiting example in FIG. 1).

Figure 3A:
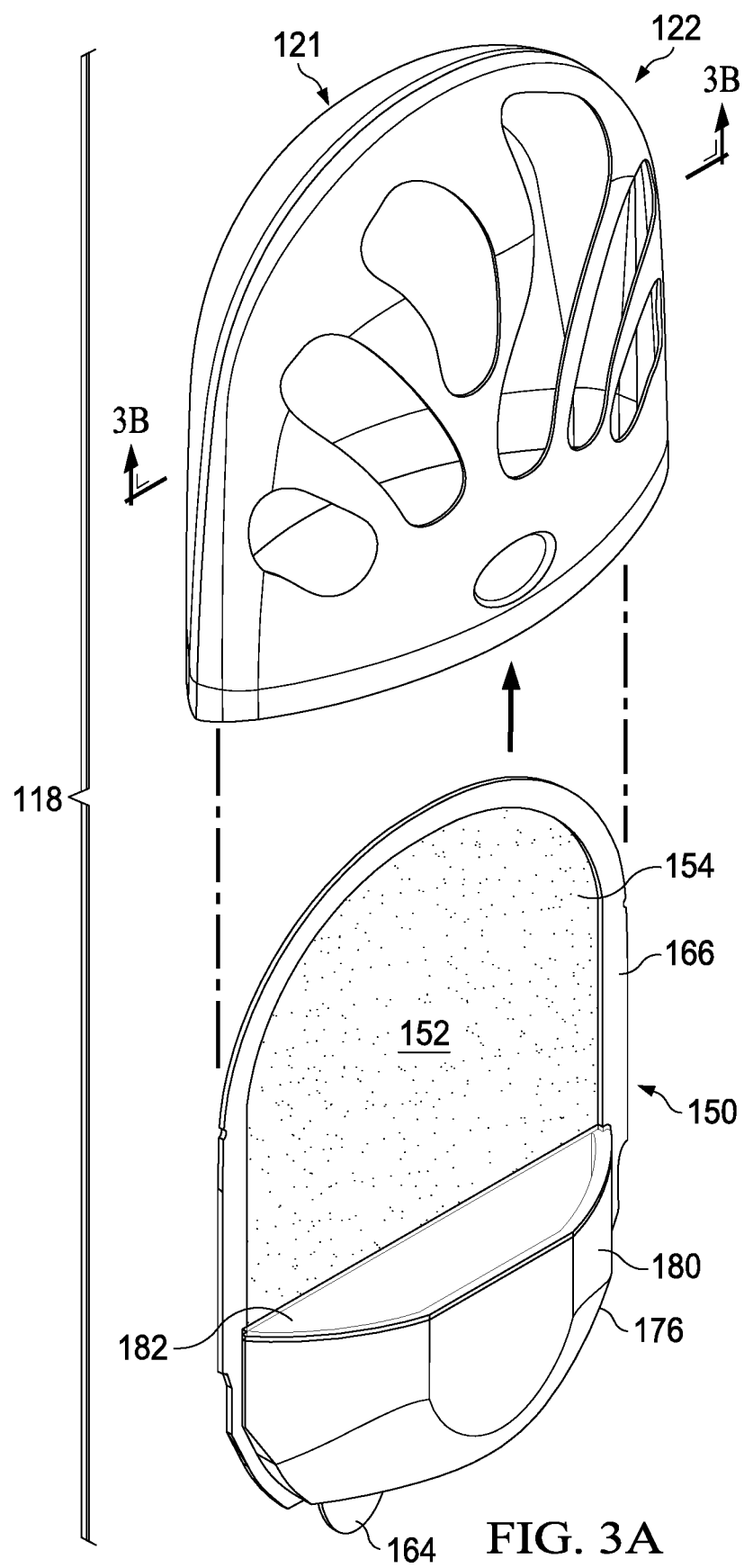
FIG. 3A is an exploded view of the cartridge of FIG. 1.
Figure 3B:
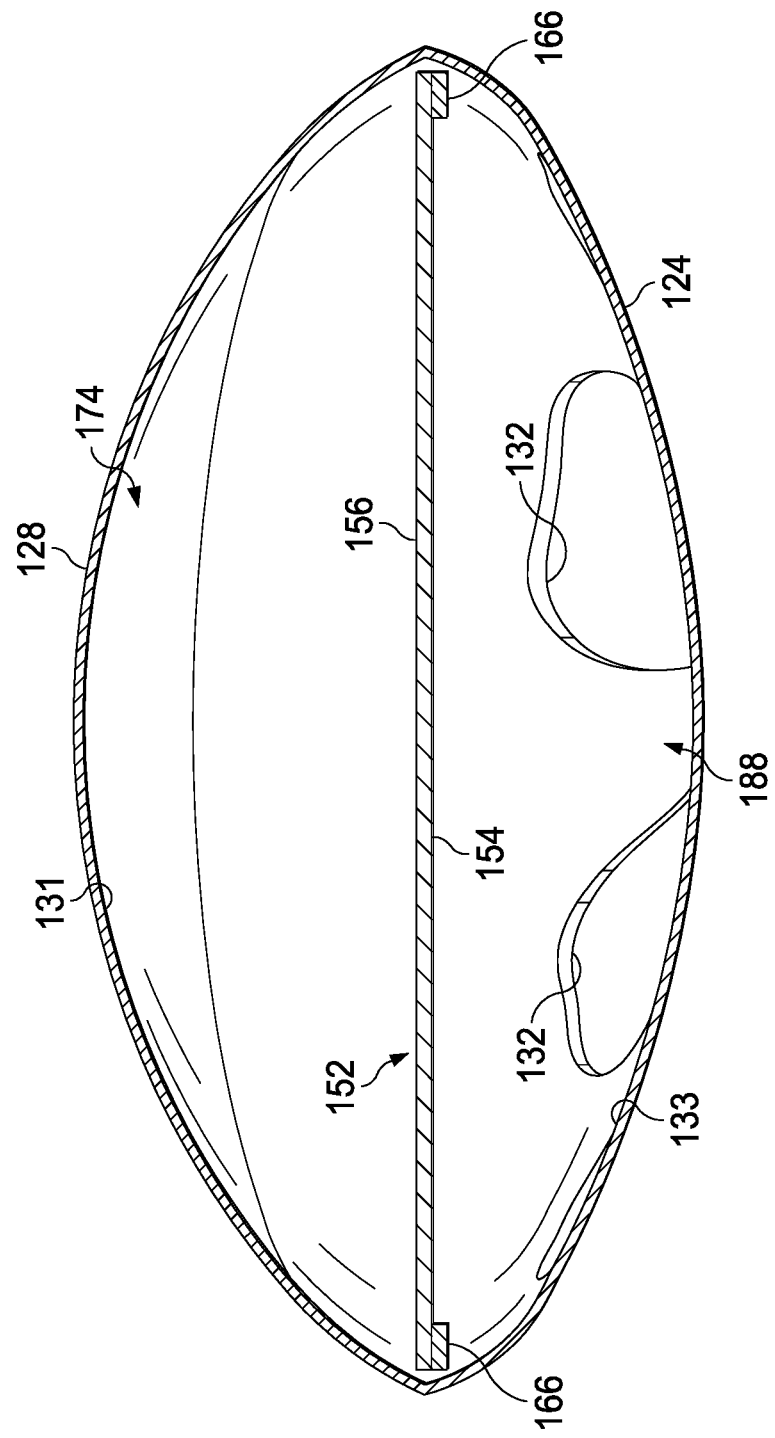
FIG. 3B is a cross-sectional view of the cartridge of FIG. 3A taken along line 3B-3B subsequent to the insertion of the insert.
Figure 4:
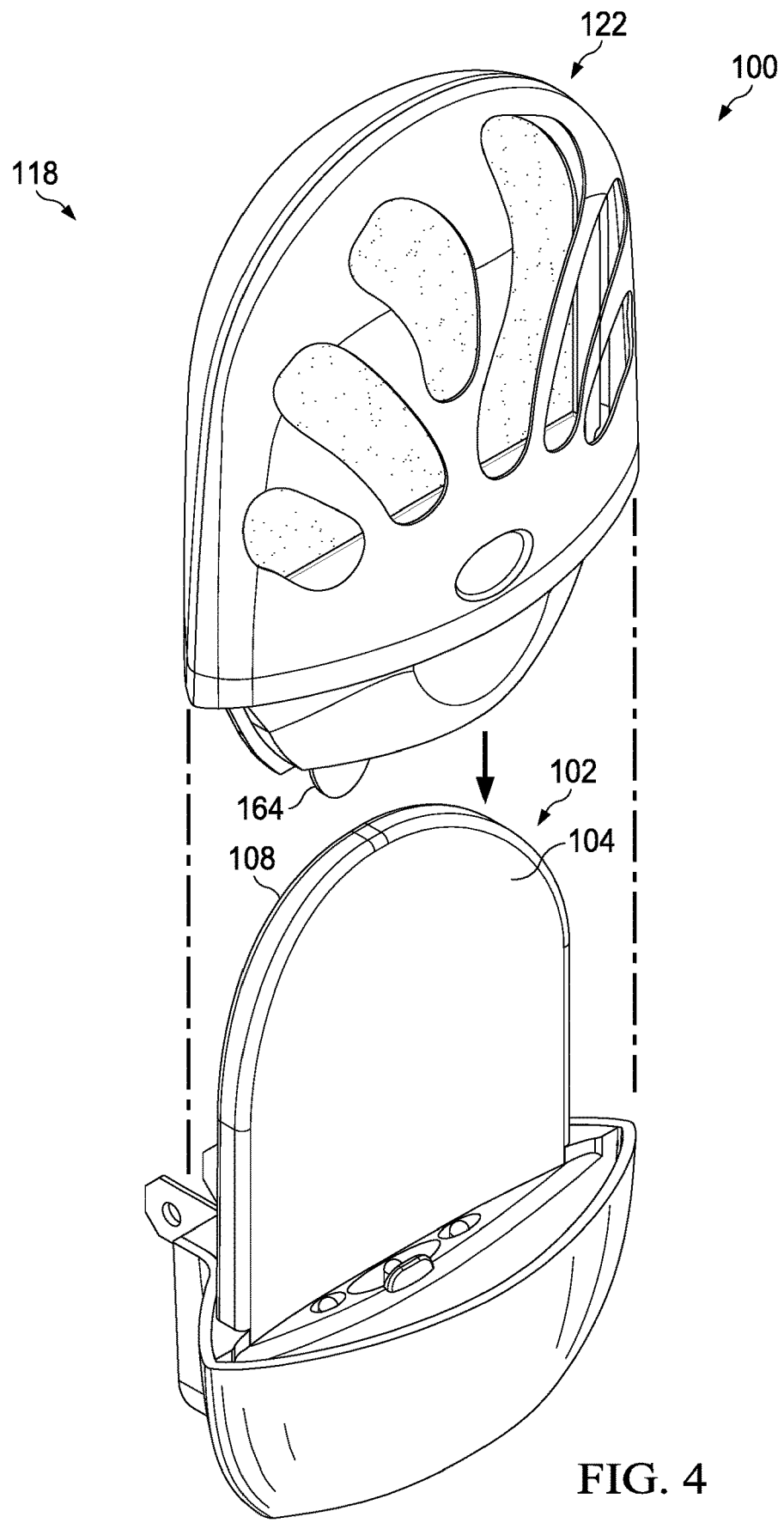
FIG. 4 depicts the cartridge of FIG. 3A being coupled to a base.

FIG. 3A depicts the insert 150 being inserted into the shell 122 and FIG. 3B is a cross-sectional view of the cartridge of FIG. 3A taken along line 3B-3B subsequent to the insertion of the insert 150. The insert 150 can comprise a frame 166 to which an adhesive portion 152 is attached or otherwise formed therewith. Once inserted into the shell 122, the adhesive portion 152 divides the shell 122 into a front cavity 188 and a rear cavity 174. The rear cavity 174 is defined by the rear face 156 of the adhesive portion 152 and the inner surface 131 of the rear housing 128 while the front cavity 188 is defined by the front face 154 of the adhesive portion 152 and the inner surface 133 of the front housing. Once the insert 150 is positioned within the shell 122, the cartridge 118 can be engaged with the base 102. FIG. 4 depicts the cartridge 118 of FIG. 3A being coupled to the base 102. The rear cavity 174 can be devoid of openings, with the exception of the bottom opening which is effectively sealed to the ambient environment when the cartridge 118 is coupled to the base 102. This arrangement of the rear cavity 174 can limit heat loss from the rear cavity 174 due to convection to the ambient environment when the insect trapping device 100 is in use. By comparison, the front cavity 188 includes one or more openings 132 to allow insects to enter the front cavity 188 thereby exposing that cavity to the ambient environment.

Referring now to FIGS. 1-4, the adhesive portion 152 immobilizes insects that enter the insect trapping device 100 through one of the openings 132 of the shell 122 and contact the adhesive. In some embodiments, the adhesive portion 152 comprises an adhesive (or an adhesive composition comprising an adhesive), wherein the adhesive or adhesive composition is coated on or otherwise applied to or incorporated in or on a substrate. The adhesive may be a pressure sensitive adhesive. In some embodiments, the adhesive is an acrylic polymer, butyl rubber, natural rubber, nitrile, silicone, styrene block copolymer, styrene-ethylene/propylene, styrene-isoprene-styrene, and/or vinyl ether adhesive or mixture thereof, for example. The substrate may be provided in a wide variety of forms, such as a film, a woven or a non-woven (including papers). In some embodiments, the substrate is in the form of a film comprising one or more polymers, such as polycarbonate, polyethylene terephthalate (PET) or polypropylene. The substrate may comprise one or more layers. Generally, the thickness of the adhesive portion 152 may be in the range of about 0.01 mm to about 5 mm. In some embodiments, the adhesive thickness may be in the range of about 0.05 mm to about 1.0 mm. The surface area of the adhesive portion 152 can be between about 25 cm² and about 150 cm². The adhesive portion 152 can comprise a transparent or translucent adhesive or adhesive composition coated onto a transparent or translucent substrate (such as a film, for example). A releasable liner can be applied to the adhesive portion 152 that is to cover the adhesive portion 152 prior to use. A user can peel away the releasable liner to expose the front face 154 of the adhesive portion 152 immediately prior to inserting the insert 150 into the shell 122, for instance.

While the insert 150 is shown to include a frame 166 completely surrounding the adhesive portion 152, this disclosure is not so limited. For instance, the frame 166 may only extend partially around the adhesive portion 152. In one example configuration, the frame 166 may extend along a first vertical side of the adhesive portion 152, across the top of the adhesive portion 152, and down the second vertical side of the adhesive portion 152. In such configuration, the bottom edge of the adhesive portion 152 is unframed. In other configurations, the insert 150 can be frameless, with the adhesive portion 152 applied at least to a central portion of a substrate, with the substrate providing sufficient structural rigidity. Further, the adhesive portion 152 can be planar, as shown, or have other suitable configurations, such as curved, for instance. As shown in FIG. 2, FIG. 3A, and FIG. 3B, the outer perimeter of the frame 166 may be shaped similarly to the shell 122.

In some configurations, the insert 150 has a reservoir 176 for storing an insect attracting composition. The insect attracting composition can be provided in a wide variety of forms, including gases, liquids, solids and combinations thereof. In some embodiments, the insect attracting composition may be provided in the form of a solid composition comprising one or more agents attractive to an insect. Solid compositions also include semi-solid compositions such as gels, which comprise one or more liquids and one or more gelling agents. The gelling agents may facilitate the formation of a cross-linked network within the insect attracting composition. The reservoir 176 may also serve to catch fallen insects, such as the insects that were originally immobilized by the adhesive portion 152 but are no longer sufficiently retained by the adhesive portion 152 after drying and becoming brittle. The reservoir 176 may be defined by a front wall 180 (FIG. 2) and a rear wall 182, with the front wall 180 defining at least part of an opening of the reservoir 176. The front wall 180 may be integrally formed with the frame 166. The reservoir 176 may have a depth of about 1 mm and about 30 mm, a width from about 10 mm to about 100 mm, and a height from about 1 mm to about 50 mm. The reservoir 176 can have a volume between about 1 cm³ and 60 cm³. The reservoir 176 can be positioned such that once the insert 150 is engaged with the shell 122 and the shell 122 is engaged with the base 102, the insect attracting composition may evaporate or disperse through the openings 132. Reservoirs in accordance with the present disclosure, such as reservoir 176, may be made as one piece, including its rear wall 182, which is then attached to the frame 166. Alternatively, reservoirs, including its rear wall, may be integrally formed with the frame from the same material, such as by an injection molding or thermoforming process. The adhesive portion 152 may terminate adjacent the reservoir opening or may downwardly extend past the reservoir opening and across the rear wall 182 of the reservoir 176. Since the insect attracting composition within the reservoir 176 may evaporate during use, it is advantageous that the reservoir 176 is coupled to the adhesive portion 152 so that both components can be replaceable simultaneously. Furthermore, due to the placement of the reservoir 176 relative to the adhesive portion 152, the reservoir 176 can be received into the base so as to not block surface area of the adhesive portion 152. This arrangement maximizes the surface area of the adhesive portion 152 for trapping insects.

In other configurations, the insert 150 may not include a reservoir 176. In yet other configurations, the insert 150 does not include a reservoir 176 and the adhesive portions 152 are positioned on both the front and rear faces of the insert 150. In such configurations, once the front face 154 of the adhesive portion 152 has immobilized a sufficient number of insects, the user may remove the insert 150 from the shell 122, rotate the insert 150, and re-insert the insert 150 into the shell 122. In this position, the rear face of the insert 150 is positioned proximate to the openings 132 and can be used to immobilize insects entering the shell.

As shown in FIG. 3A, the insert 150 may be selectively inserted into to the shell 122 by a user to prepare the cartridge 118 for attachment to the base 102. In some configurations, the insert 150 may be mechanically engaged with the shell 122 when the insert 150 is fully seated with the shell 122, such as through interlocking features or a friction-fit, for instance. The cartridge 118 also comprises a downwardly depending tab 164. The downwardly depending tab 164 can be positioned on the insert 150 or on the shell 122. A switch (not shown) is positioned on the base 102 that receives the downwardly depending tab 164 when the cartridge 118 engages the base 102. The switch in the base 102 can function to operate one or more of the insect attractants (i.e., the electric heating element 110, the light source 114, etc.), so that such insect attractants can only be energized when the cartridge 118 is engaged to the base 102. As such, when the cartridge 118 is removed from the base 102, the switch is deactivated and power is removed from the insect attractants.

The downwardly depending tab 164 can be positioned such that a vertical centerline of downwardly depending tab 164 is offset from a vertical centerline of the insert 150. Offsetting of the downwardly depending tab 164 may serve to aid in properly aligning the cartridge 118 with the base 102. More specifically, the cartridge 118 may only be fully seated into the base 102 when the cartridge 118 is facing the proper direction so that the downwardly depending tab 164 is received into the switch. Furthermore, the downwardly depending tab 164 can help to insure the insert 150 is properly arranged in the shell 122. The downwardly depending tab 164 can also function as a convenient grip point for the user during insertion or removal of the insert 150. The downwardly depending tab 164 can have any suitable configuration or shape. In some configurations, the downwardly depending tab 164 has a width at its vertical midpoint that is less than 75% the width of the bottom edge of the insert 150. In some configurations, the downwardly depending tab 164 has a width at its vertical midpoint that is less than 50% the width of the bottom edge of the insert 150. In some configurations, the downwardly depending tab 164 has a width at its vertical midpoint that is less than 25% the width of the bottom edge of the insert 150. In some configurations, the downwardly depending tab 164 has a width at its vertical midpoint that is less than 10% the width of the bottom edge of the insert 150. In some configurations, the downwardly depending tab 164 overlaps the vertical centerline of the insert 150 while being asymmetric about the vertical centerline of the insert 150.

To couple the cartridge 118 to the base 102 to prepare the insect trapping device 100 for use, the cartridge 118 is lowered over a shroud 108 (FIG. 4), such that the shroud 108 is received into the rear cavity 174 (FIG. 3B) of the shell 122 through the bottom opening 134 (FIG. 2) and positioned between a rear face of the adhesive portion 152 and an inner surface of the rear housing 128. The shroud 108 is an upstanding portion extending upward from the base 201 that envelops the electric heating element 110. The relative positioning and alignment of the cartridge 118 to the base 102 during coupling can be assisted by the shroud 108, as the shroud 108 can serve to properly guide the cartridge 118 onto the base 102. Further, the receiving of the shroud 108 into the shell 122 during coupling also helps assure proper alignment of the downwardly depending tab 164 with a switch positioned in the base 102. A portion of the base 102 may be received into the shell 122 to mechanically engage the cartridge 118 to the base 102. Such engagement may utilize a friction-fit connection, or other suitable type of connection, such as utilizing a clip, latch, magnet, or detent, for example, to maintain the coupling between the shell 122 and the base 102 until the user wishes to decouple the cartridge 118 and the base 102. Once the cartridge 118 is affixed to the base 102, the insect trapping device 100 can then be operated to attract and immobilize insects.

Figure 5A:
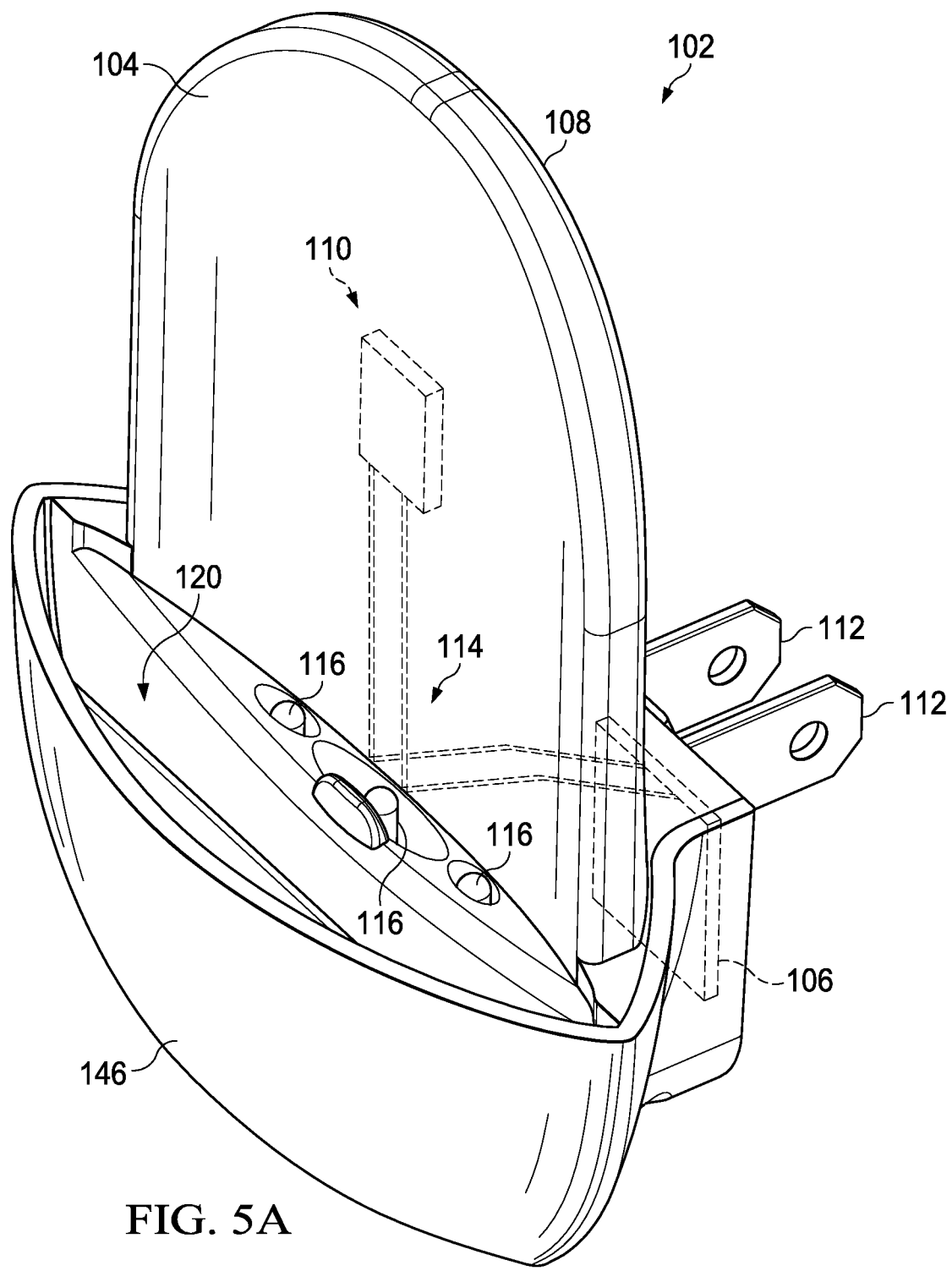
FIG. 5A depicts an isometric view of the base of FIG. 1.
Figure 5B:
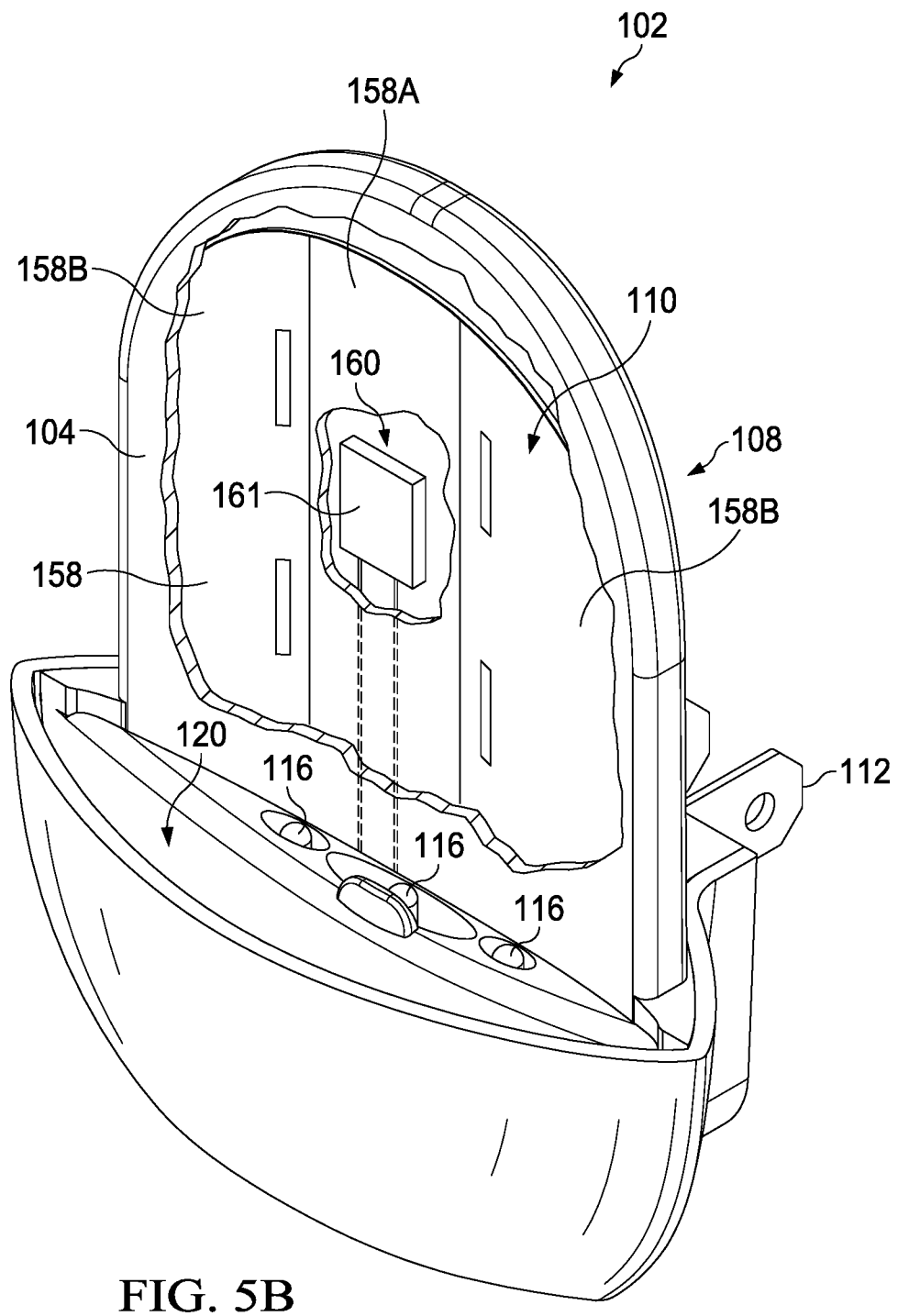
FIG. 5B depicts a partial cutaway view of the base of FIG. 5A.

FIG. 5A depicts an isometric view of the base 102, shown with the cartridge 118 removed for clarity, and FIG. 5B depicts a partial cutaway view of the base 102 to illustrate the electric heating element 110 in more detail. Referring to FIGS. 1-5B, when the cartridge 118 is engaged to the base 102, the shroud 108 extends through the bottom opening 134 and into the rear cavity 174 of the shell 122 and is positioned between the rear housing 128 and the insert 150. In the illustrated configuration, the electric heating element 110 is positioned within the shroud 108. The shroud 108 protects the electric heating element 110 and assists with the dissipating the heat generated by the electric heating element 110 during operation. As used herein, electric heating element 110 refers to the devices that convert electricity to heat for the purposes of heating. As such, wiring, control circuitry, connectors, mounts, and the like that may be associated with an electric heating element 110 are not components of the electric heating element 110. The electric heating element 110 may be, for example, a positive temperature coefficient (PTC) heater having one or more heatable surfaces, a resistance-based heater, or any other type of element that converts electrical energy into thermal energy. Further, the temperature of the electric heating element 110 may be controlled through self-regulation or utilize various temperature control circuitry, such as thermostats and the like. As is to be appreciated, this disclosure is not to be limited to any particular type of electric heating element 110 or control circuitry. However, the use of a PTC thermistor as the electric heating element 110 may offer a less complex and less costly means for heating the shroud 108 than provided by other heating techniques. Electric heating elements requiring thermostats, for instance, may require the positioning of the additional components and feedback circuitry within the base 102, which could result in more complex manufacturing processes.

When energized by a suitable power source (batteries, wall socket, etc.), the electric heating element 110 heats the shroud 108. The shroud 108 then radiates heat first to the rear face of proximate adhesive portion 152 of the insert 150 which is disposed adjacent to a front surface 104 of the shroud 108. As the rear face of the adhesive portion 152 is heated, then the opposing front face 154 of the adhesive portion 152 is heated. Accordingly, the heat path of the insect trapping device 100 is from the electric heating element 110, to the shroud 108, to the rear surface of the adhesive portion 152 (via convection heating and/or radiant heating), which in turn warms the front face 154 of the adhesive portion 152. Warming the adhesive portion 152 may aid in attracting certain types of insects to the insect trapping device 100. For instance, the heated adhesive portion 152 may mimic the thermal signature of a biological surface (i.e., skin) and, therefore, attract insects drawn to skin, such as mosquitos, fleas, ticks, and so forth. Such insects will be drawn to the heated adhesive portion 152 and come into contact with the front face 154 of the adhesive portion 152, thereby becoming trapped.

In the illustrated configuration, the light source 114 serves as another insect attractant and is positioned within the base 102. The wavelength and type of light source 114 that are utilized can be selected to attract insects that are drawn to certain types of light. The light source 114 is shown as light emitting diodes (LEDs) 116, which are a form of solid state lighting. In one embodiment, the light source 114 comprises three LEDs 116. The LEDs 116 may use any suitable attachment technology, such as through-hole technology. In some configurations one or more of the LEDs 116 utilize surface-mount technology (SMT) such that the LEDs 116 are a surface-mount device (SMD). Each of the LEDs 116 may have a diameter between about 0.5 mm and about 10 mm. Further, each of the LEDs may have a surface area of 0.5 mm$^2$ and about 100 mm$^2$. Some examples of LEDs include semi-conductor light emitting diodes, polymer light emitting diodes, organic light emitting diodes, etc. Other light sources that may be used include, but are not limited to, incandescent or filament based lights, fluorescent lights, halogen lights, xenon lights or other light sources known in the art. The lights may or may not have a filter to adjust the wavelength of their output. Further, as used herein, the light source 114 is the light generating component or element of the lighting technology utilized as the insect attractant. In this regard, the light source 114 may be any of a diode, a filament, an energized gas, and so forth. The light source 114 does not include wiring, connectors, bases, lenses, or elements that may be associated with the light generating component or element. The light source 114 is positioned external to the upstanding heat shroud 108. The light source 114 may be in front of, below, beside, or mounted on a surface of the shroud 108. This positioning may allow the light to be more effectively deflected by the front surface 104 of the shroud 108 toward the adhesive portion 152. It also may provide for more even radiant heating by the front surface 104 of the shroud 108. Examples of such an external placement are illustrated as LEDs 116 in light source 114 in FIG. 2, and LEDs 216 on the insert 250 in FIG. 6A, and LEDs 516 in FIG. 12. The light source 114 is positioned such that when the cartridge 118 is engaged to the base 102, the light source 114 is positioned between the shroud 108 and the insert 150. As such, when the light source 114 is energized, it illuminates rear face 156 of the adhesive portion 152 directly and indirectly by way of light reflecting off of the shroud 108. This configuration further enables an advantageous unobstructed light path between the LEDs 116 and the adhesive portion 152, and enables both light and heat to be provided as insect attractants without interference from one another. In some embodiments, the light source 114 is disposed at or near the base of the shroud 108 so as not to interfere with either the heat radiating from the shroud 108 or the reflection of light from the shroud 108 toward the rear face 156 of the adhesive portion 152. The illustrated configuration can also provide an effective forward transmission of the light from the light source 114. More specifically, the relative positioning of the LEDs 116 between the adhesive portion 152 and the shroud 108, while in close proximity to the shroud 108, increases the amount of forward deflection of the light through the adhesive portion 152. This configuration also provides an air gap between the shroud 108 and the adhesive portion 152 to help alleviate hot spots on the adhesive portion 152 that otherwise might be present when using a single point heater. The use of a single point heating element 110, such as shown in FIG. 5A, while simpler and less expensive may need to run hotter than a multi-point heating element and/or results in the center portion of the shroud being hotter than the edges of the shroud 108 due to the radiation/dissipation of the heat. The air mass created inside the rear cavity 174 of the shell 122, which in some embodiments envelops the shroud 108 about its front and rear surfaces, may further enhance the thermal stability and evenness of the heated surface of the adhesive portion 152. In this configuration, the light path is from the light source 114 to the rear face of the adhesive portion 152, either directly and/or reflected off the shroud 108. The light then travels through the rear face of the adhesive portion 152 and out the front face 156 of the adhesive portion 152. Insects drawn to the illuminated and heated adhesive portion 152 will become trapped by its front face 156, which is disposed within the front cavity 188 and opposite openings 132.

The shroud 108 can have a front surface 104 that faces the rear surface of the adhesive portion 152 of the cartridge 118. The front surface 104 can be concave such that a cavity is formed between the center portion of the shroud 108 and adhesive portion 152 when the cartridge 118 is engaged to the base 102. While the front surface 104 of the shroud 108 is illustrated as a smooth concave surface, this disclosure is not so limited. The front surface 104 can have any suitable configuration or combination of surfaces that form a concave shape in which the central portion of the front surface 104 is recessed relative to the side portions of front surface 104 thereby forming an inwardly directed bulge. Example configurations of the front surface 104 can include planar portions, beveled portions, curved portions, curvilinear portions, and so forth. Additionally, the front surface 104 can be continuous (as shown) or be discontinuous such that it has gaps or other types of separations. In some arrangements, the shroud 108 and its front surface 104 can be collectively formed by two or more shrouds that are positioned proximate to each other, either in direct contact or spaced apart. Such multi-shroud arrangements may not necessarily use a single point heating element, as each shroud may be heated separately. The light source 114 may be positioned on the base 102 within the cavity formed between the front surface 104 of the shroud 108 and the rear surface of the adhesive portion 152 when the cartridge 118 is engaged to the base 102. As such, in addition to lighting the adhesive portion 152, the light source 114 also illuminates the front surface 104 of the shroud 108. The relative positioning of the front surface 104 and the light source 114 can allow for the front surface 104 to serve as a reflector to reflect at least some of the light from the light source 114 onto the rear face 156 of the adhesive portion 152. As shown in FIG. 5A, for instance, the light source 114 is positioned in the base 102 at the bottom of the shroud 108. Further, the light source 114 is shown to be positioned below the front surface 104 of the shroud 108 as well as being positioned in front of the front surface 104. In accordance with various configurations, at least a portion of the front surface 104 may be roughened to aid in light diffusion, scattering, and/or reflection. In some configurations, the roughened portion of the front surface 104 has a surface roughness (Ra) from about SPI A-1 to about SPI D-3. Further, the roughened portion may have a surface area that is between about 70% to about 100% of the surface area of the front surface 104 of the shroud 108.

A circuit board 106 (FIG. 5A) can be positioned within the base 102 that includes the circuitry for operating the electric heating element 110 and the light source 114. The circuit board 106 may be vertically mounted within the base 102 so that it can be positioned behind the reservoir 176. With the circuit board 106 positioned behind the reservoir 176, the possibility of the insect attracting composition contacting the circuitry is minimized. As shown in FIGS. 5A-5B, the base 102 may also define a cavity 120 that is sized to receive at least a portion of the reservoir 176 when the shell 122 is coupled to the base 102.

When observing the insect trapping device 100 from the front side during operation (i.e., the side opposite of the prongs 112 in FIG. 12), the front face 154 of the adhesive portion 152 may be at least partially viewable through the openings 132. Since the light source 114 is positioned behind the adhesive portion 152, when the light source 114 is activated, the adhesive portion 152 is lit from its rear face. The shroud 108 that houses the electric heating element 110 is positioned behind both the adhesive portion 152 and the light source 114, and functions to heat the illuminated adhesive portion 152 to within a desired temperature range. Positioning the heating element 110 behind the adhesive portion 152 further provides an added advantage of hiding the relatively hot heating element 110 (which may be heated to greater than 50° C.) from the insects, particularly mosquitoes, entering the front enclosure through the openings 132 in the front housing 124 of the shell 122. As described in more detail below, due in part to the concave front surface 104 and the relative placement and configuration of the electric heating element 110 within the shroud 108, the entire surface area of the adhesive portion 152 can generally be evenly heated to aid in mimicking biological tissue while avoiding hot spots to increase the efficacy of the insect trapping device 100.

Referring now to FIG. 5B, a partial cutaway view of the base 102 depicts an example internal arrangement of the shroud 108. The electric heating element 110 comprises one or more PTC heating elements 160 that are in thermal contact with a metal plate 158. For the purposes of illustration, only one PTC heating element 160 is shown in FIG. 5B. An example PTC heating element is a switch type PTC thermistor, such as PTC Heating Element model number 15-6-0.3 manufactured by ShenZhen Jinke Special Materials Co., Ltd., A planar front surface 161 of the PTC heating element 160, which is heated when the PCT heating element 160 is activated, is in contact with the metal plate 158. As such, the heat generated by the PTC heating element 160 is conductively spread across the surface area of the metal plate 158. The metal plate 158 can have a thickness from about 0.25 mm to about 1.5 mm and can be made from aluminum or other heat conducting material. The metal plate 158 can be sized such that it is generally the same size as the front surface 104. In some configurations, the metal plate 158 has a width that is greater than 5 cm and a surface area between about 23 cm$^2$ and about 148 cm$^2$. The width of the metal plate 158 is determined when the metal plate 158 is oriented as it would be during use by a consumer to attract and capture the insects.

Further, the metal plate 158 can be structured to generally follow the concaved geometry of the front surface 104. In the illustrated configuration, for instance, the metal plate 158 includes a planar central section 158A with planar wings 158B positioned on either side, with the wings 158B being angled relative to the central section 158A. In other configurations, the metal plate 158 is curved, or includes planar sections and curved sections. The PTC heating element 160 can be coupled to the metal plate 158 (such as to the central section 158A using any suitable technique, such as clips, adhesives, or the like.) In any event, the metal plate 158 assists with disbursing the heat generated by the PTC heating element 160 so that the shroud 108 can be heated.

Due to its proximity to the PTC heating element 160, the central area of the metal plate 158 will be hotter than the peripheral areas of the metal plate 158. As such, the portion of the front surface 104 of the shroud 108 proximate to the central area of the metal plate 158 may be hotter than portions of the front surface 104 of the shroud 108 that are proximate to the peripheral areas of the metal plate 158. Due to the concave arrangement of the front surface 104, however, the portions of the front surface 104 that are proximate to the peripheral areas of the metal plate 158 are positioned closer to the adhesive portion 152, and the portion of the front surface 104 that is proximate to the peripheral areas of the metal plate 158 is spaced further away from the adhesive portion 152. Such arrangement assists in the generally even heating of the entire surface area of the adhesive portion 152. Additional details regarding the relative spacing between the adhesive portion and the front surface of an example insect trapping device is described in more detail below with regard to FIG. 12.

During operation of the insect trapping device 100, once the electric heating element 110 is activated, the front surface 104 of the shroud 108 may reach a steady state average temperature in less than 1 hour. The steady state average temperature of the front surface 104 of the shroud 108 may be between about 40° C. and about 50° C. at an ambient temperature of about 23° C. Furthermore, the front surface 104 may have minimum and maximum steady state temperatures within +/−6, 8, 10, or 12° C. of the steady state average temperature at an ambient temperature of about 23° C. The absolute difference between the minimum and the maximum steady state temperatures of the front surface 104 can be about 10, 12, 14, 16, 18, 20, or 22° C. The adhesive portion 152 may have a steady state average temperature between about 32° C. and about 38° C. at an ambient temperature of about 23° C. At an ambient temperature of about 30° C. (which can be a proxy for hotter days in countries such as China or Brazil), the adhesive portion 152 may have a steady state average temperature between about 35° C. and about 40.5° C. The direct heat minimum and direct heat maximum steady state temperatures of the adhesive portion 152 may be within +/−1.5° C. of the steady state average temperature, or the direct heat minimum and direct heat maximum steady state temperatures of the adhesive portion 152 may be in the range of about +/−1.5° C. to about +/−3.5° C. of the steady state average temperature, or the direct heat minimum and direct heat maximum steady state temperatures of the adhesive portion 152 may be in the range of about +/−2.5° C. to about +/−3.5° C. of the steady state average temperature. The absolute difference between the direct heat minimum and the direct heat maximum can be less than about 2.5° C., 5° C., or 7.5° C. These are the minimum and maximum temperatures of that portion of the adhesive portion that is directly in front of the shroud. In some embodiments, greater than 50, 60%, 70%, 80% or 90% of the surface area of the adhesive portion is heated to temperatures that fall between the direct heat minimum temperature and the direct heat maximum temperature. The minimum steady state temperature and the maximum steady state temperature of the entire adhesive portion that is heated, whether or not directly in front of the shroud, may be within +/−5° C. of the steady state average temperature. The set point temperature (Ts) of the front surface 161 of the PTC heating element 160 may be between about 50° C. and about 70° C. Surface temperature test methods are provided below.

Providing the shroud 108 as a component of the base 102 is beneficial since it may be undesirable to discard the shroud 108 with the cartridge 118 of the device. Instead, components of the cartridge 118 (or the whole cartridge) can be replaced as-needed, with the shroud 108 remaining with the base 102. Moreover, by enclosing the shroud 108 with the cartridge 118 during operation of the insect trapping device 100, the cartridge 118 serves to chamber the shroud 108 to allow it to generally heat faster, more evenly, and with fewer effects from atmospheric perturbations and turbulence. If the shroud 108 is not chambered, it would need to operate at a higher temperature to heat the adhesive portion 152 to the desired temperature, thus making the insect trapping device 100 more susceptible to larger variations in surface temperatures of the adhesive portion 152. Further, since the shroud 108 is positioned within the rear cavity 174 and is not readily accessible by insects entering the front cavity 188 of the shell 122, hot spots and/or temperatures greater than 50° C. will not be readily visible to the insects such as mosquitoes. In addition, since surface area of the front surface 104 of the shroud 108 may be substantially similar to the surface area of front face 154 of the adhesive portion 152, it is easier to heat the rear face 156 of the adhesive portion 152 evenly to the desired temperature range. In some embodiments, the front surface 104 of the shroud 108 has a surface area that is 50%, 60%, 70%, 80%, 90% or more of the surface area of the rear face 156 of the adhesive portion 152.

Due to the relative placement of the adhesive portion 152 to the shroud 108, the configuration of the cartridge 118 also serves to beneficially minimize the amount of adhesive-free heated surface that insects might otherwise be attracted to, which would undesirably draw then away from the trapping adhesive surface of the device (i.e., adhesive portion 152). Finally, the shell 122 may prevent insects from detecting high temperature portions of the insect trapping device 100, which might otherwise repel the insects.

Figure 6A:
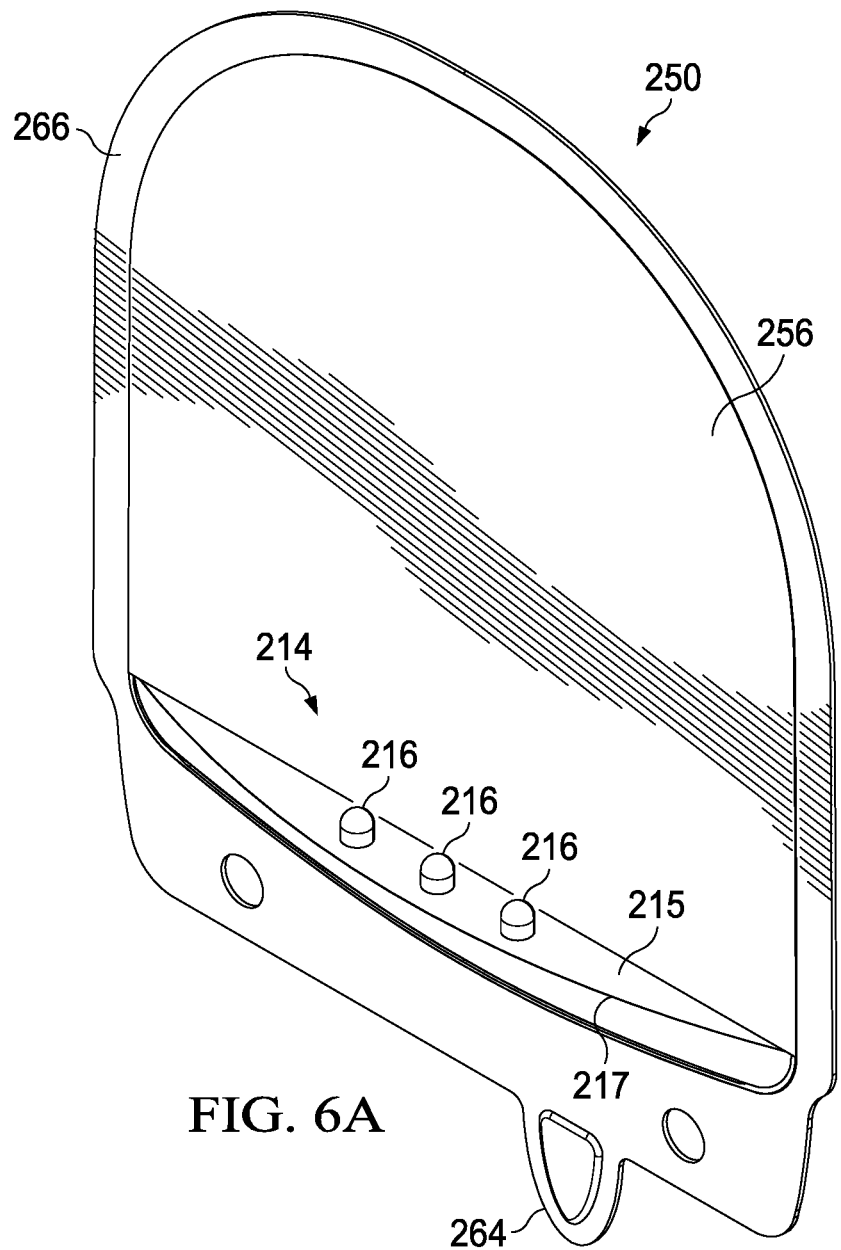
FIGS. 6A-6B are isometric views of an insert having a light source.
Figure 6B:
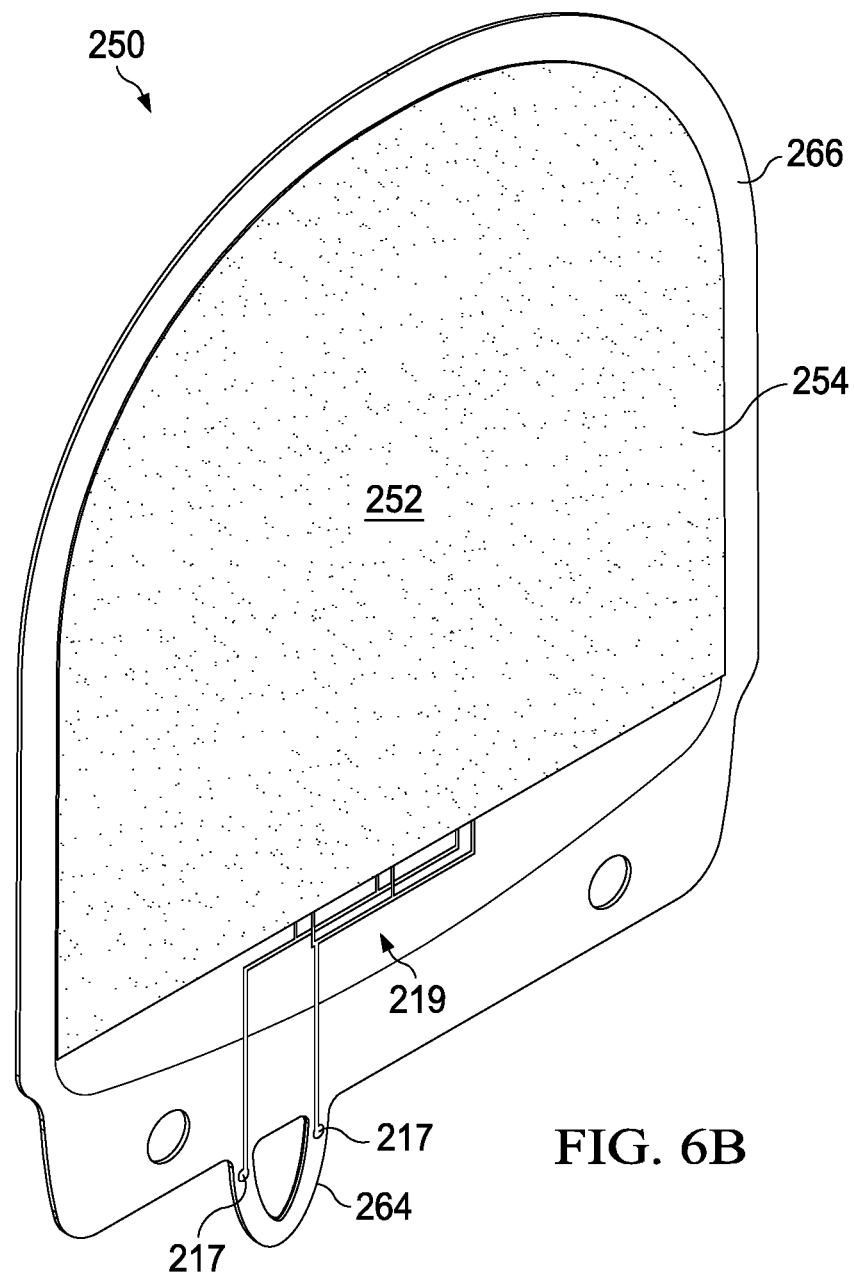

Turning now to alternative insert configurations, FIGS. 6A-6B and 7A-7B depict example inserts 250 and 350 that each include onboard light sources. Such insets 250 and 350 may be used with bases of insect trapping devices that do not have light sources. FIGS. 6A-6B depict isometric views of an example insert 250 that does not include a reservoir. Similar to the insert 150 described herein, the insert 250 has an adhesive portion 252 that is surrounded by a frame 266 and having a front face 254 to trap insects thereon. The insert 250 also has a light source 214, which is shown to include a set of LEDs 216. The LEDs 216 are positioned such that they are behind the adhesive portion 252 (relative to an observer of the device) during operation of the associated insect trapping device, and a rear face 256 of the adhesive portion 252 is illuminated upon activation of the LEDs 216. The insert 250 has a ledge 215 having a leading edge 217 which may mirror the shape of the front surface of a shroud of an associated base. The insert 250 also has a downwardly depending tab 264 extending from a lower portion of the insert 250. The vertical centerline of the downwardly depending tab 264 is offset from the vertical centerline of the insert 250 and is positioned to be received into a switch of a corresponding base. The downwardly depending tab 264 also has electrical contacts 217 that are positioned to come into electrical contact with corresponding contacts in a base of an insect trapping device. Once in electrical contact with a base, power can be provided through the electrical contacts 217 and circuitry 219 to illuminate the light source 214 and/or other attractants that may be onboard the insert 250.

Figure 7A:
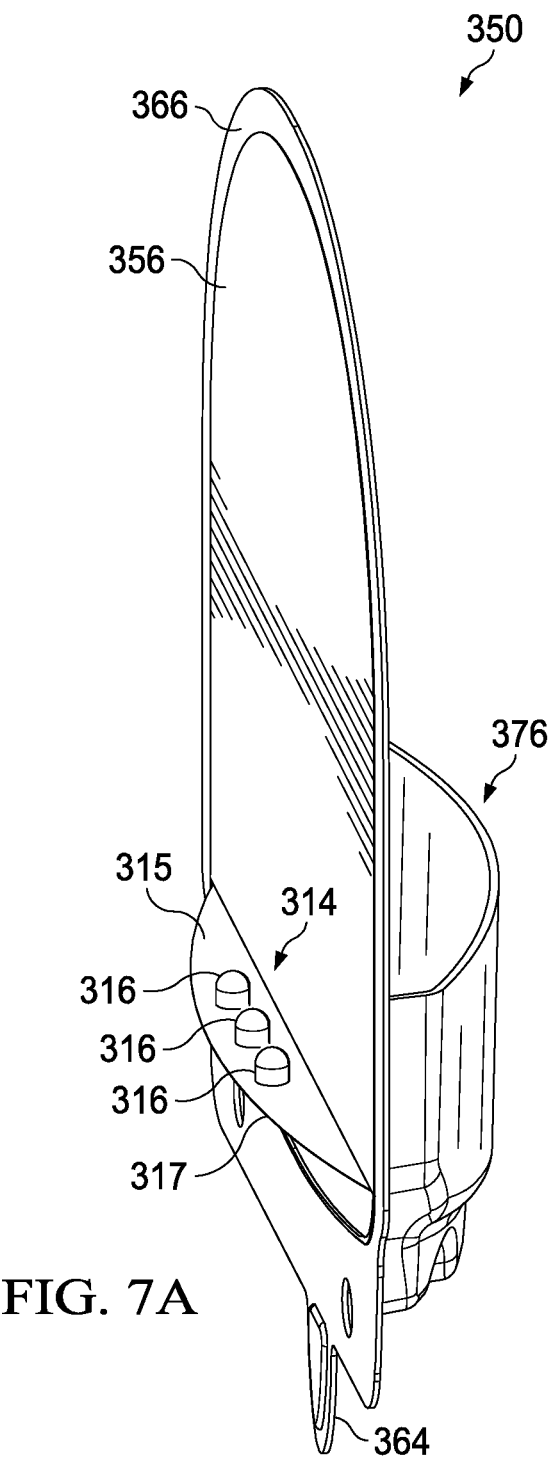
FIGS. 7A-7B are isometric views of an insert having a light source and a reservoir.
Figure 7B:
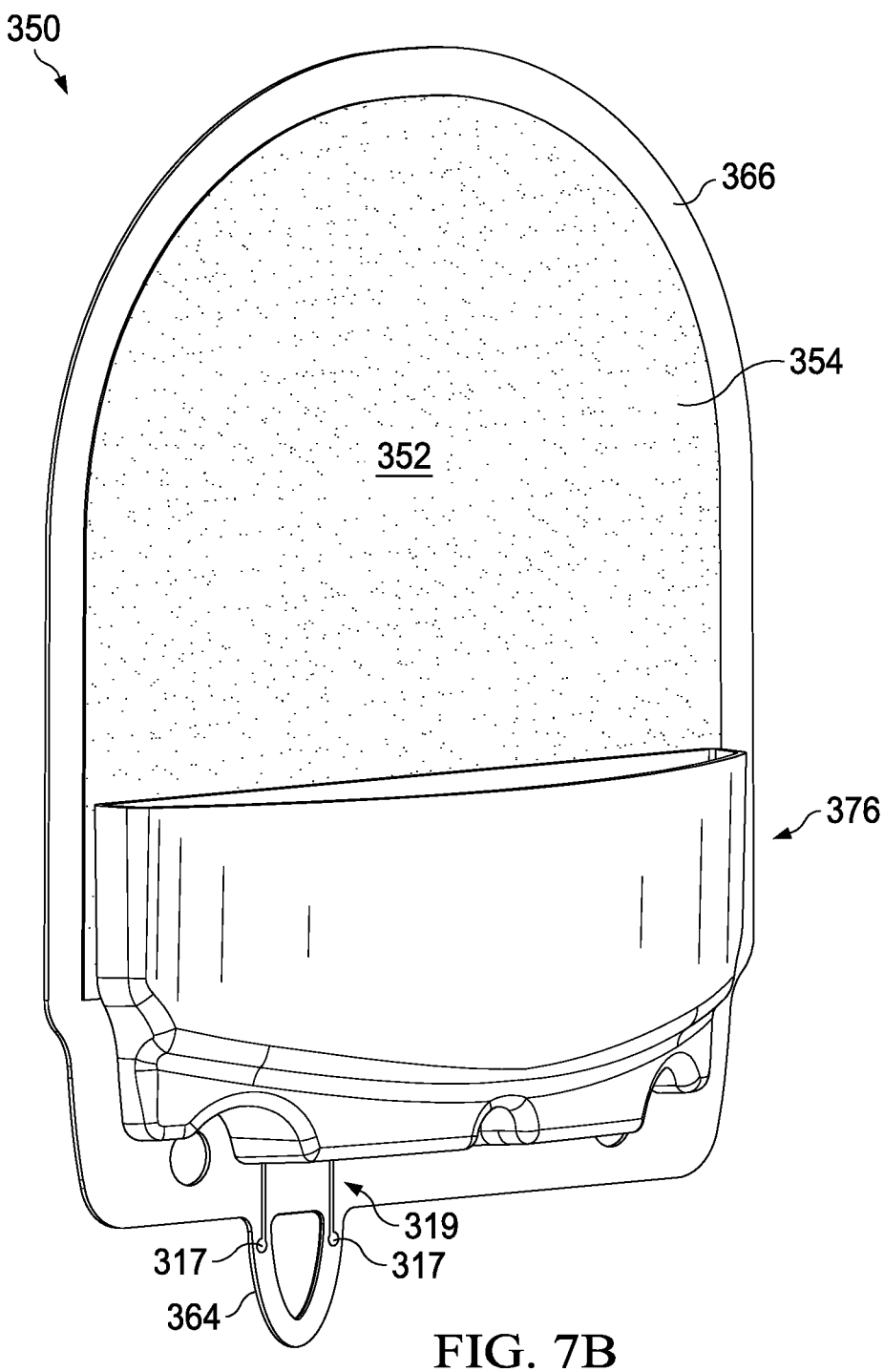

FIGS. 7A-7B show isometric views of an insert 350 that is similar to the insert 250, except that the insert 350 includes a reservoir 376. Similar to the insert 250, the insert 350 has an adhesive portion 352 that is surrounded by a frame 366 and having a front face 554 to trap insects thereon. The insert 350 also has a light source 314, which is shown as a set of LEDs 316. The LEDs 316 are positioned on the opposite side of the insert 350 from the reservoir 376, such that once the insert 350 is slid into a shell, the LEDs 316 are positioned behind the adhesive portion 352 (relative to an observer of the device) to illuminate its rear face 356. The insert 350 has a ledge 315 having a leading edge 317 which may mirror the shape of the front surface of a shroud of an associated base. The insert 350 also has a downwardly depending tab 364 extending from a lower portion of the insert 350, which has electrical contacts 317, similar to the arrangement as described above in FIGS. 6A-6B. Once in electrical contact with a base, power can be provided through the electrical contracts 317 and circuitry 319 to illuminate the light source 314 and/or other attractants that may be onboard the insert 350.

Figure 8:
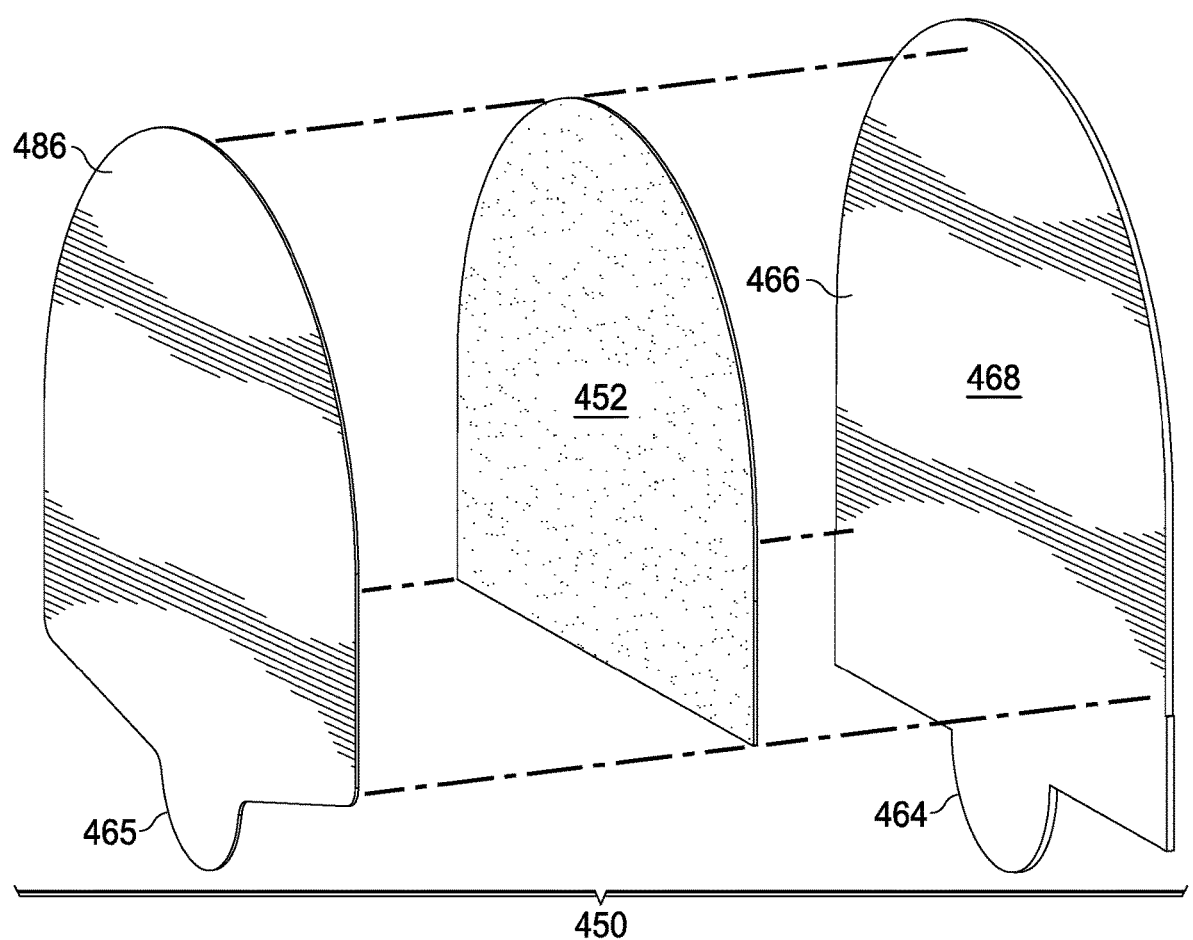
FIG. 8 depicts an exploded view of an example frameless insert.

While the inserts described above utilize a frame construction, this disclosure is not so limited. FIG. 8 depicts an exploded view of an insert 450 having a frameless configuration. As shown, an adhesive portion 452 is affixed to a substantially solid base member 468. The base member 468 can be, for instance, semi-rigid card stock, or other suitable material. Nevertheless, the solid base member 468 can allow for the adhesive portion 452 to be heated in accordance with the temperature parameters described above. The base member 468 can include a downwardly depending tab 464 that can function to provide a gripping point for the user and also be used to activate a switch in an insect trapping device. While FIG. 8 illustrates that the vertical centerline of the downwardly depending tab 464 is generally aligned with a vertical centerline of the base member 468, in other configurations the vertical centerline of the downwardly depending tab 464 is offset from the vertical centerline of the base member 468. Further, while FIG. 8 depicts the adhesive portion 452 being positioned on a first side of the base member 468, this disclosure is not so limited. In some configurations, for instance, a second adhesive portion is affixed to the second side of the base member 468. Such configuration (sometimes referred to as a doubled-sided insert) may allow for the insert 450 to be removed from a shell, flipped by the user, and then re-inserted into the shell for future use. Also, shown in FIG. 8 is a releasable liner 486 that can be affixed to the base member 468 to cover and protect the adhesive portion 452 prior to use. As with other inserts described herein, the releasable liner 486 can be added to the insert 450 (and/or a reservoir of the insert) during manufacture such that the insert 450 is packaged and shipped with the releasable liner 486 covering the adhesive portion 452. Immediately prior to inserting the insert 450 into a shell of an insect trapping device, the user can remove and dispose of the releasable liner 486 to expose the adhesive portion 452 and prepare the insert 450 for use. In the illustrated configuration, the releasable liner 486 includes a tab 465 that is disconnected from the base member 468 to provide a grip point for the user.

Figure 9A:
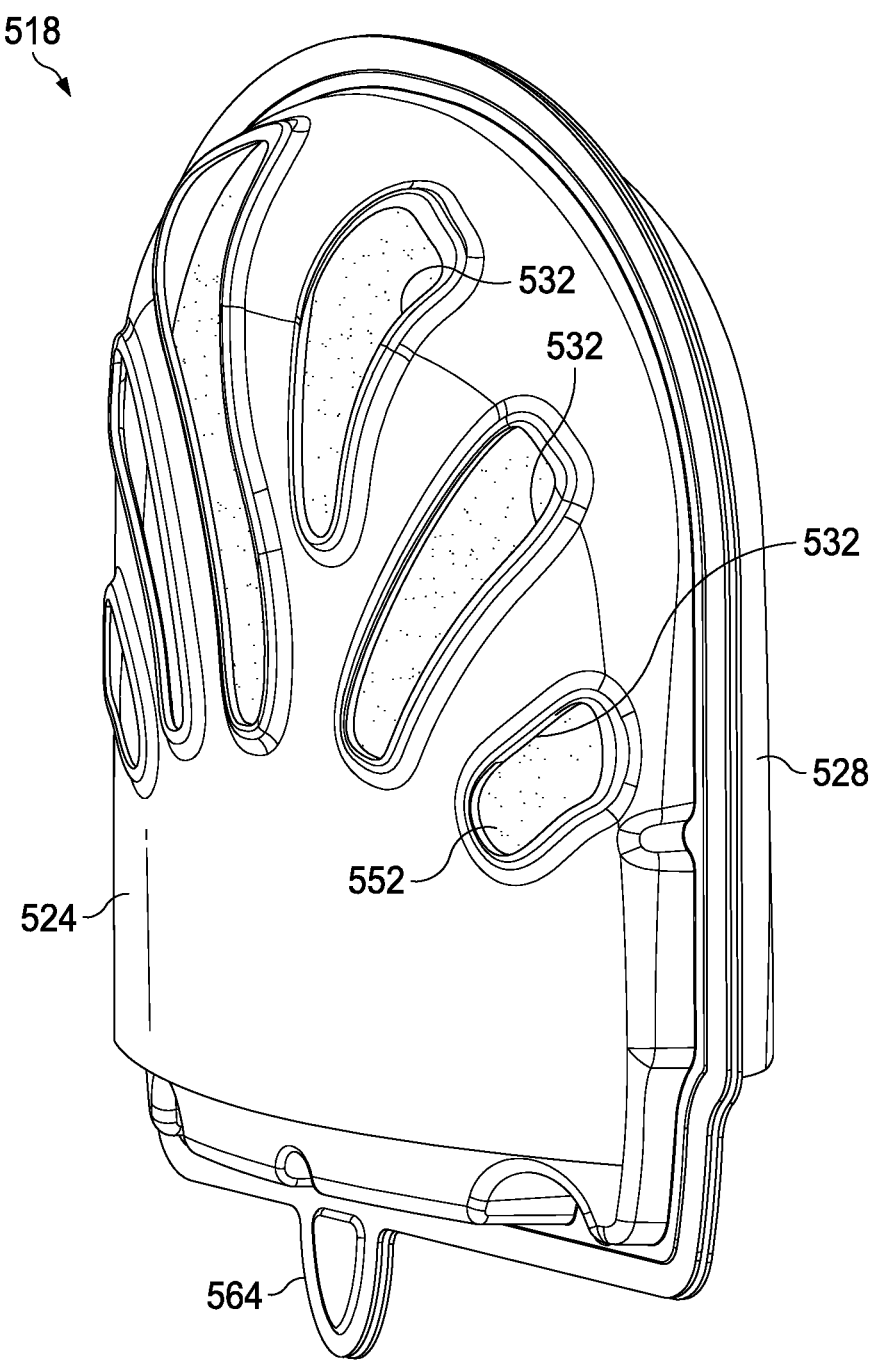
FIGS. 9A-9B are isometric views of an another example cartridge.
Figure 9B:
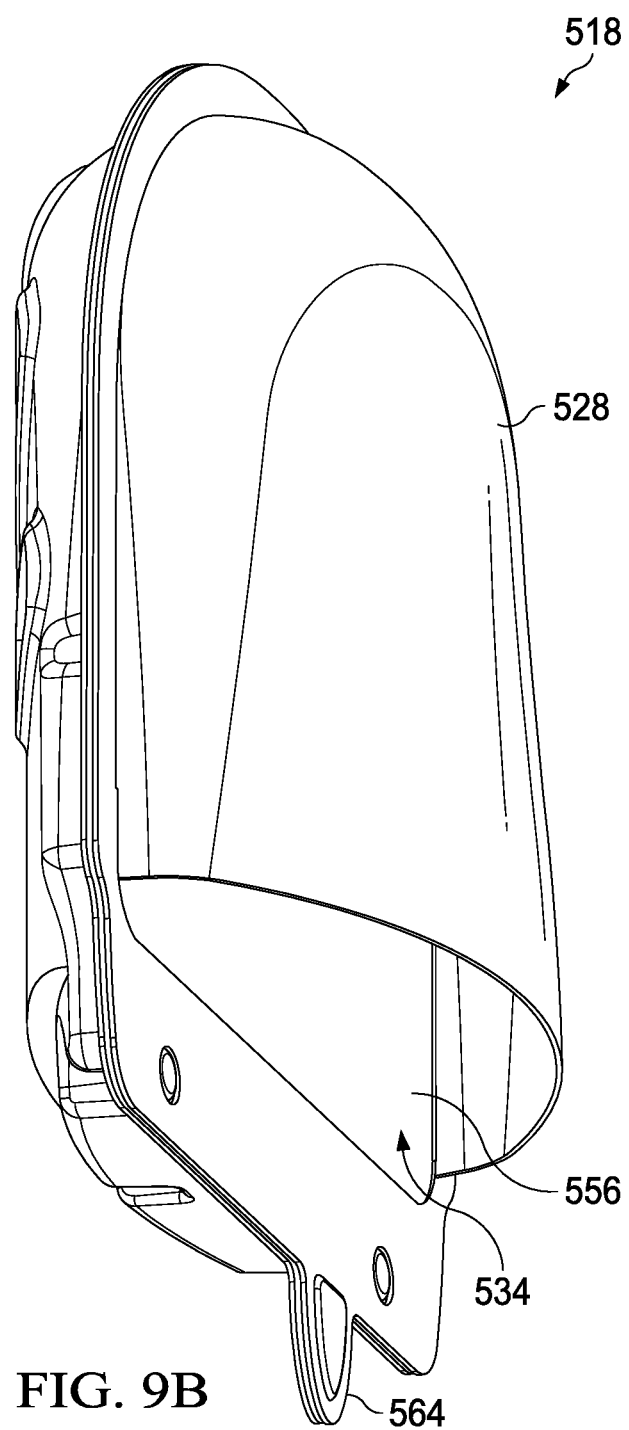
Figure 10:
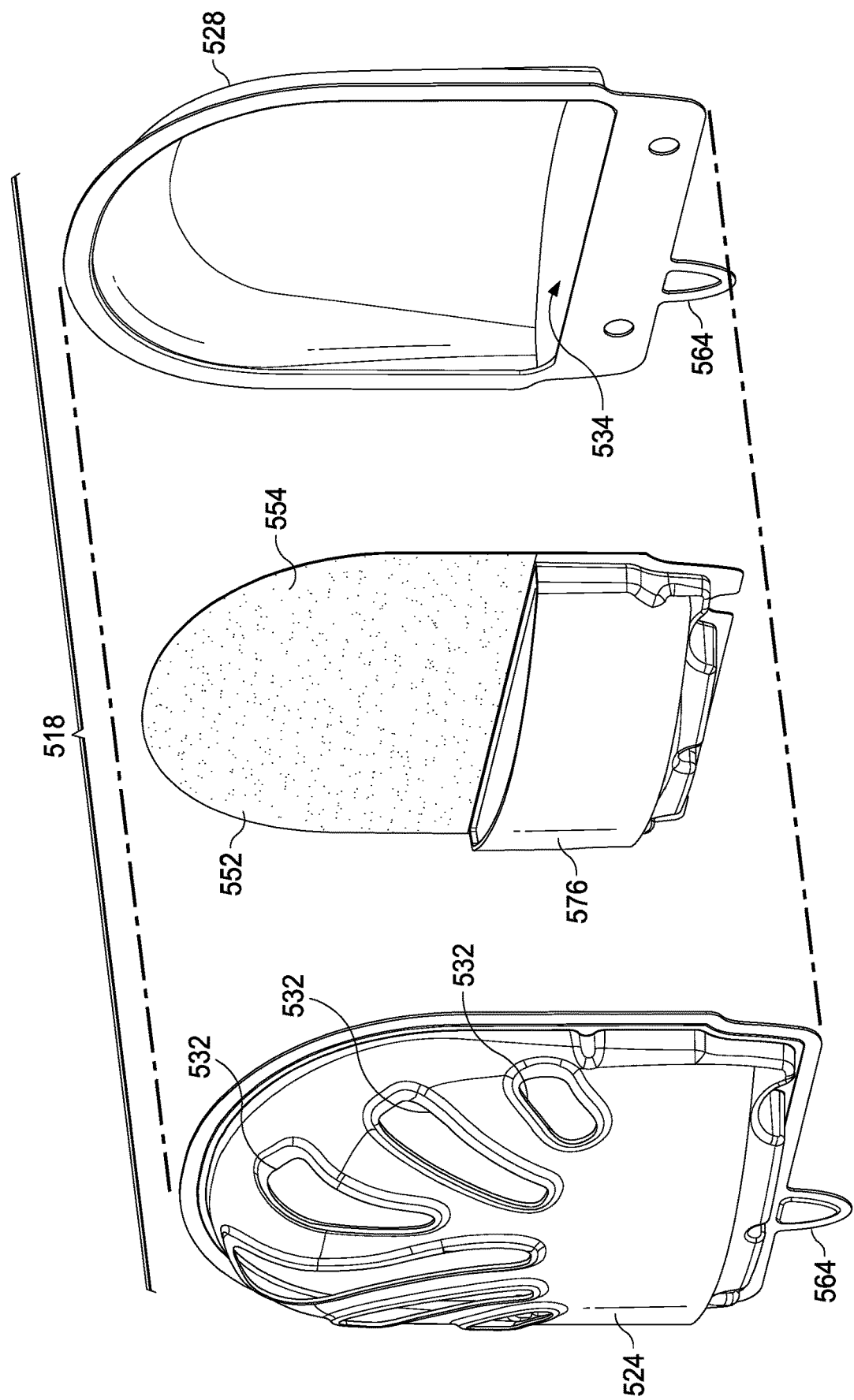
FIG. 10 is an exploded view of the cartridge shown in FIGS. 9A-9B.
Figure 11:
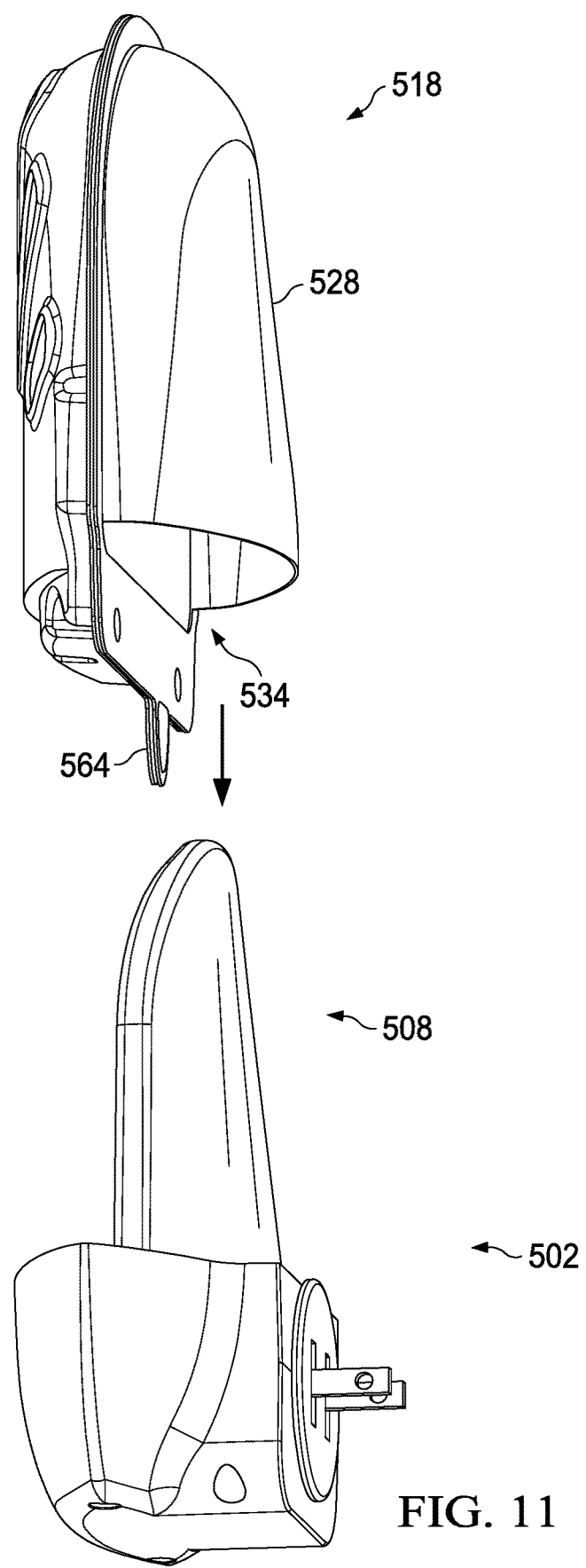
FIG. 11 depicts an example insect trapping device using the cartridge of FIGS. 9A-9B.
Figure 12:
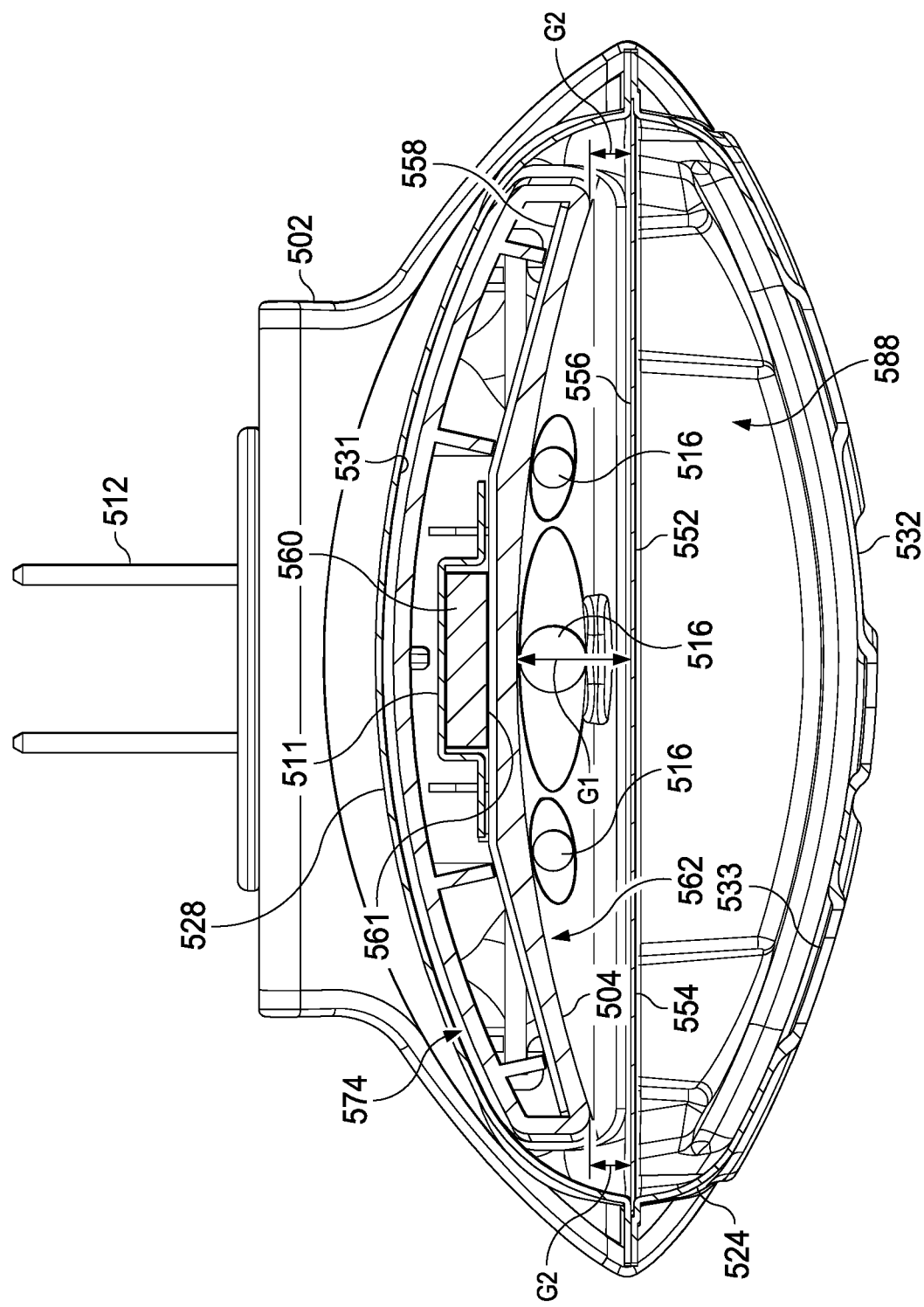
FIG. 12 is a lateral cross-sectional view of the cartridge and the base of FIG. 11 taken through the geometric center of the shroud subsequent to the coupling of the cartridge to the base.

Turning now to alternative cartridge configurations, FIGS. 9A-13B depict example cartridges 518 and 618 that have adhesive portions non-removably positioned inside the cartridge. As such, the cartridge may be affixed to a base of an insect trapping device, and then subsequent to use, the entire cartridge may be removed and disposed of by the user. A fresh cartridge may then be affixed to the base and operation of the insect trapping device can be resumed. FIGS. 9A-9B depict isometric views of an example cartridge 518 which may be used with the base depicted in FIG. 11. FIG. 10 depicts an exploded view of the cartridge 518 to illustrate one example configuration of an adhesive portion 552 and a reservoir 576. The reservoir 576 can be similar to the reservoir 176 described above with respect to insert 150. It is noted, however, that some configurations do not include the reservoir 576. The cartridge 518 can be similar to or the same in many respects as the cartridge 118. For example, a front housing 524 of the cartridge 518 can define one or more openings 532 for receiving a flying or crawling insect such that they will come in contact with a front surface 554 of the adhesive portion 552. The adhesive portion 552 of cartridge 518, however, is non-removably positioned between the front housing 524 and a rear housing 528 and divides the interior of the cartridge into a front cavity 588 and a rear cavity 574, as shown in FIG. 12. The front housing 524 and the rear housing 528 and/or the adhesive portion 552 can be coupled using any suitable technique, such as ultrasonic welding, adhesives, mechanical fasteners, and the like. Alternatively, the front housing 524 and the rear housing 528 can be a unitary structure formed by injection molding, for example. As shown in FIG. 9B, the rear housing 528 can be convex and spaced apart from a rear face 556 of the adhesive portion 552 at the bottom of cartridge 518 such that they collectively define a bottom opening 534. The cartridge 518 can further include a downwardly depending tab 564 to engage a switch on the base 502 (FIG. 11).

FIG. 11 illustrates the cartridge 518 being coupled to the base 502. FIG. 12 is a lateral cross-sectional view of the cartridge 518 (FIG. 11) and the base 502 taken through at the geometric center of the shroud 508 subsequent to the coupling of the cartridge 518 to the base 502. The base 502 can be similar to or the same in many respects as the base 102. For example, the base 502 can include a shroud 508 having a front surface 504 that is positioned proximate to a metal plate 558. A planar front surface 561 of a PTC heating element 560 can be coupled to the metal plate 558, such that when the PTC heating element 560 is activated, the metal plate 558 is heated. In this configuration, the PTC heating element 560 is held to the metal plate 558 via a clip 511.

As shown in FIGS. 11-12, the shroud 508 can be received through the bottom opening 534 of the cartridge 518 and into the rear cavity 574 of the cartridge 518, the rear cavity 574 being defined by the rear face 556 of the adhesive portion 552 and the inner surface 531 of the rear housing 528. A front cavity 588 is defined between the front face 554 of the adhesive portion 552 and the inside surface 533 of the front housing 524. Once the cartridge 518 is fully seated, the adhesive portion 552 will be positioned adjacent the front surface 504 of the shroud 508. An inner cavity 562 is defined between the rear face 556 of the adhesive portion 552 and the front surface 504 of the shroud 508. The inner cavity 562 is part of the rear cavity 574. The rear cavity 574, the front cavity 588, and the inner cavity 562 can be warmed by the heat generated by the PTC heating element 560 during operation, although the rear cavity 574 will typically be hotter than the front cavity 588. LEDs 516 are positioned within the inner cavity 562, such that, when activated they illuminate the rear surface 556 of the adhesive portion 552 and the front surface 504 of the shroud 508. Similar to the front surface 104 described above, the front surface 504 of the shroud 508 can include roughened portions to aid in light distribution within the inner cavity 562. During operation, insects enter the front cavity 588 through the openings 532 in the front housing 524.

In some configurations, the total interior volume of the rear cavity 574, which includes any volume occupied by the shroud 508, is between about 75 cm³ and 150 cm³. The volume of the shroud 508 may be between about 25 cm³ and 100 cm³. The air gap volume, which is the total interior volume of rear cavity 574 minus the volume of the shroud 508 may be between about 37 cm³ and 120 cm³. In some configurations, the air gap volume is about 20% to 80% of the total interior volume of the rear cavity 574. In some configurations, the air gap is 65% of total interior volume of the rear cavity 574 and 35% is the volume of the shroud 508. As provided above, the air gap can serve to enhance the thermal stability of the heated surface of the adhesive portion 552.

In the illustrated configuration, due to the concave geometry of the front surface 504 of the shroud 508 and the planar adhesive portion 552, a gap (G1) is defined between the rear face 556 of the adhesive portion 552 and the front surface 504 of the shroud 508 at the center of the shroud 508. A gap (G2) is defined between the rear face 556 of the adhesive portion 552 and the front surface 504 at the side edges of the shroud 508. The length of gap (G1) is greater than the length of gap (G2). The gap (G1) can be between about 4 mm and about 12 mm and the gap (G2) can be between about 0.5 mm and about 3 mm. As shown, the portion of the shroud 508 proximate to the gap (G1) is positioned closer to the PTC heating element 560 than the portion of the shroud 508 proximate to the gap (G2). As such, the portion of the shroud 508 proximate to the gap (G1) will generally be heated to a higher temperature than the portion of the shroud 508 proximate to the gap (G2). However, the adhesive portion 552 is spaced further away from the front surface 504 of the shroud 508 proximate to the gap (G1). The adhesive portion 552 is spaced closer to the front surface 504 of the shroud 508 proximate to the gap (G2). Reducing the distance between the adhesive portion 552 and the shroud 508 at the edges of the shroud 508 and increasing the distance between the adhesive portion 552 and the shroud 508 at the center of the shroud 508, can generally account for the temperature gradient between the central portion of the front surface 504 and the edges of the shroud 508. Accordingly, the adhesive portion 552 may be uniformly heated across its entire surface area. Without intending to be bound by any theory, it is believed that uniformly heating the adhesive portion 552 (i.e., avoiding localized hot spots), increases the efficacy of the insect trapping device, as it is believed that an evenly heated adhesive portion 552 more closely mimics biological tissue.

Figure 13B:
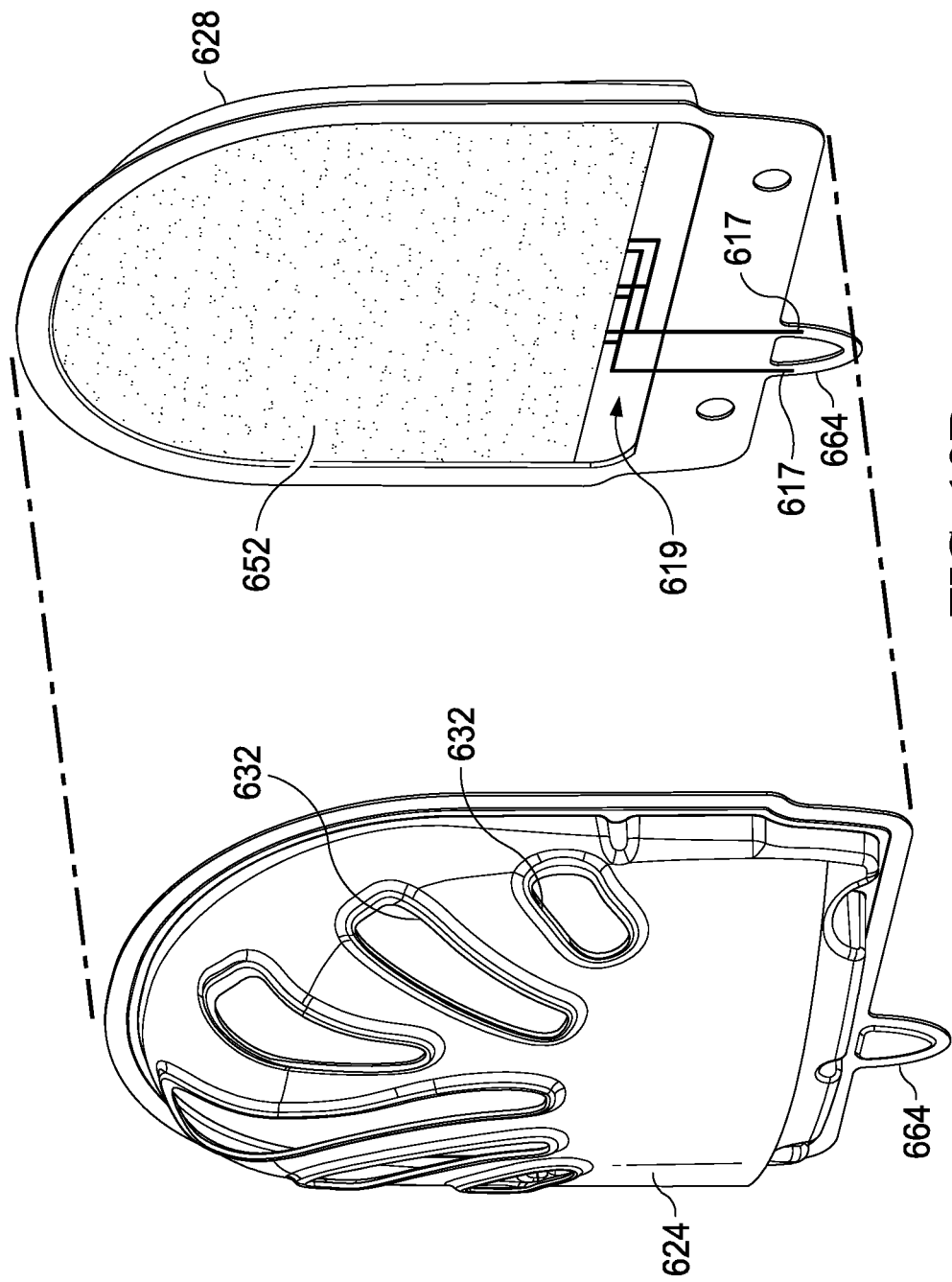

Referring now to FIGS. 13A-13B, exploded isometric views of another example cartridge 618 are illustrated. The cartridge 618 can be similar to or the same in many respects as the cartridge 518. For example, the cartridge 618 has a front housing 624 defining one or more openings 632 for receiving a flying or crawling insect. An adhesive portion 652 is non-removably mounted between the front housing and a rear housing 628. The cartridge 618 can further include a downwardly depending tab 664 to engage a switch on an associated base. Similar to the inserts 250 and 350, the cartridge 618 comprises a light source 614, which is shown to include a set of LEDs 616. The LEDs 616 are positioned such that they are behind the adhesive portion 652 during operation of an associated insect trapping device. The vertical centerline of the downwardly depending tab 664 is offset from the vertical centerline of the cartridge 618 and is positioned to be received into a switch of a corresponding base. The downwardly depending tab 664 also has electrical contacts 617 that are positioned to come into electrical contact with corresponding contacts in a base of an insect trapping device. Once in the electrical contact with a base, power can be provided through the electrical contacts 617 and circuitry 619 to illuminate the light source 614 and/or other attractants that may be onboard the cartridge 618. The cartridge 618 can be coupled to a base similar to the base 502 of FIG. 11, such that a shroud similar to shroud 508 can be received through the bottom opening 634 of the cartridge 618. The adhesive portion 652 can then be warmed in accordance with the techniques described above and the LEDs 616 can illuminate the rear surface of the adhesive portion 652.

Figure 14:
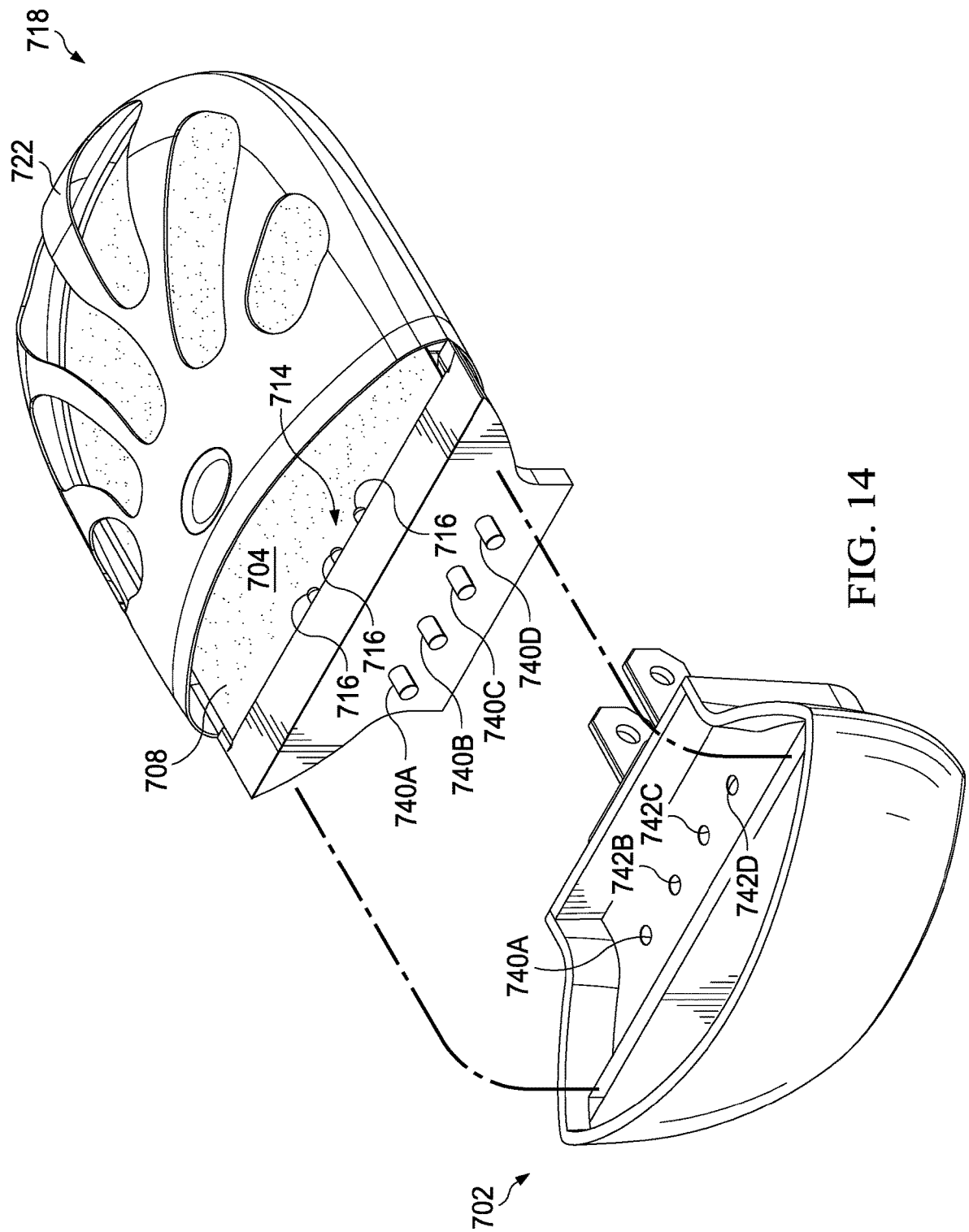
FIG. 14 depicts an example cartridge having a shell that can be loaded with an insert and then coupled to a base.
Figure 15:
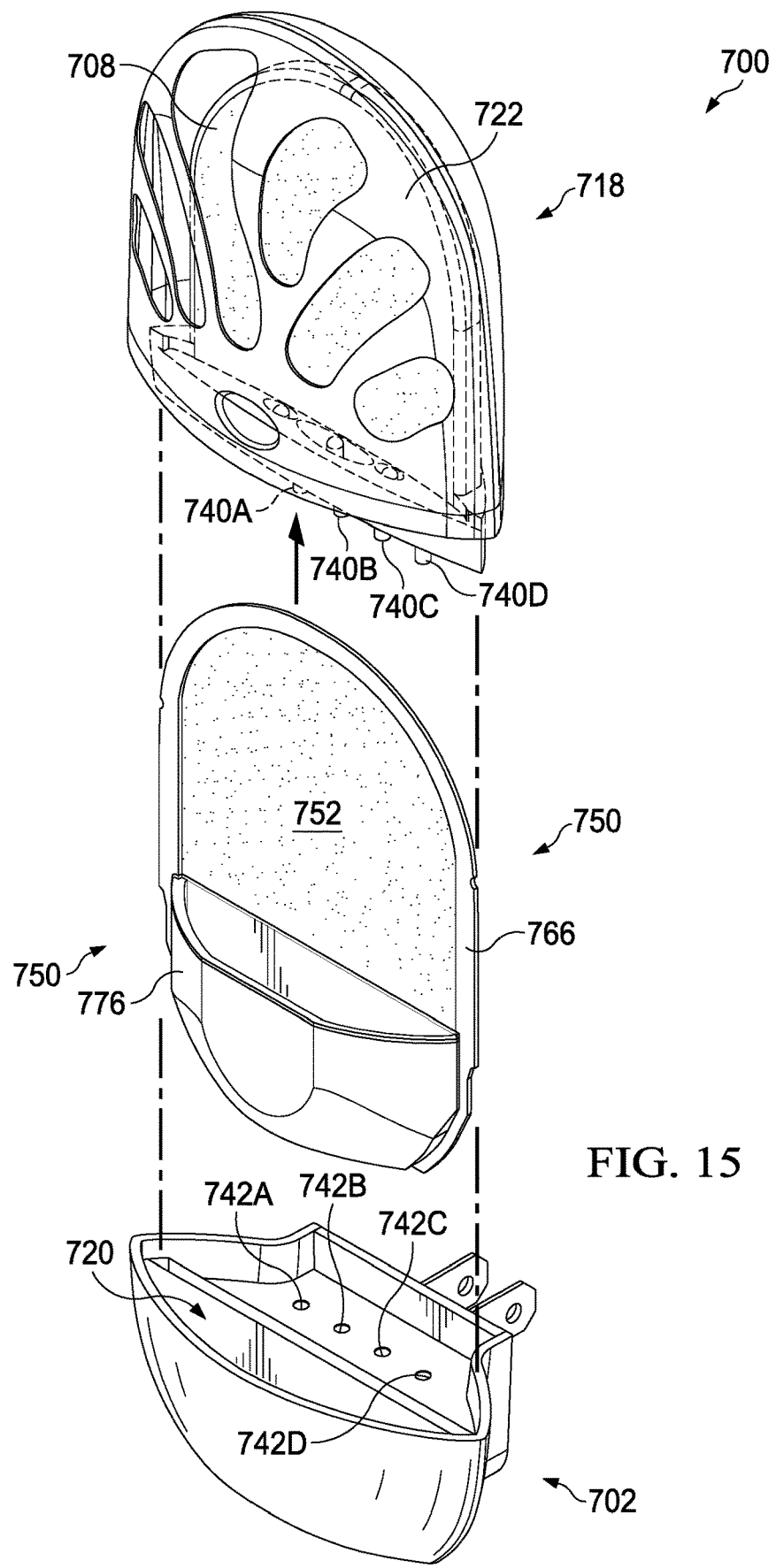
FIG. 15 depicts an exploded isometric view of an insect trapping device.

Referring now to FIGS. 14-18, additional example configurations of cartridges and bases are illustrated. In these configurations, a shell of the cartridge can non-removably house the electric heating element and/or the light source. Similar to previously described configurations, an insert can be releaseably retained at least partially in the shell such that an adhesive portion of the insert can be heated by the heating element and illuminated by a light source. FIG. 14 depicts an example cartridge 718 having a shell 722 that can be loaded with an insert 752 (FIG. 15). Once the insert is seated within the shell 722, the cartridge 718 can then be coupled to a base 702, as described in more detail below. A shroud 708 is positioned with the shell 722 and similar to previously described configurations, one or more electric heating elements can be positioned behind a concave front surface 704 of the shroud 708. The shell also comprises a light source 714, which in the illustrated embodiment comprises three LEDs 716 positioned proximate to the base of the front surface 704. At least a portion of the front surface 704 can be roughened to aid in light diffusion, scattering, and/or reflection of the light generated by a light source 714. The cartridge 718 can have electrical contacts 740A-D that are positioned such that they engage with respective electrical contacts 742A-D of the base 702. In some configurations, the electrical contacts 740A-D of the cartridge are pins and the electrical contacts 742A-D of the base 702 are sockets, however other configurations may be used. The total number of electrical contacts can vary based on the needs of the electrical heating element, light source, and forth, but in the illustrated cartridge 718, electrical contacts 740B and 740C are associated with circuity for the light source 714 and the electrical contacts 740A and 740D are associated with circuitry for the electric heating element. This arrangement allow for different voltage/current levels to be provided by the base 102 to electrical contacts 740B and 740C as compared to the voltage/current levels provided to electrical contracts 740A and 740D of the electric heating element.

Figure 16:
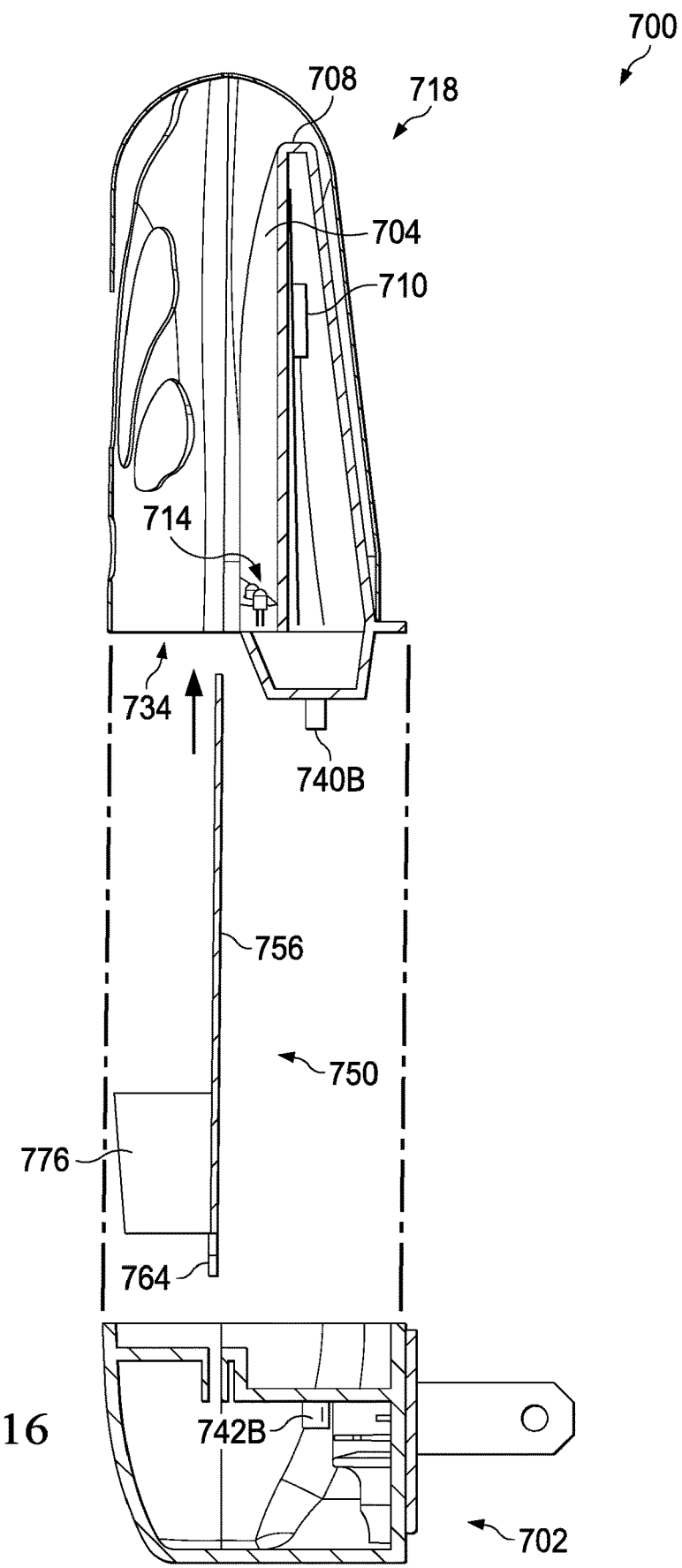
FIG. 16 is a side cross-sectional view of the insect trapping device of FIG. 15 taken along its vertical axis.

FIG. 15 depicts an exploded isometric view of an insect trapping device 700. An example insert 750 is shown being inserted into the cartridge 718 of FIG. 14 which may then be coupled to the base 702 of FIG. 14. For further clarification, FIG. 16 is a side cross-sectional view of the insect trapping device 700 of FIG. 15 taken along the vertical axis. Referring now to FIGS. 15-16, the insert 750 can be similar to previously described inserts and have a frame 766, an adhesive portion 752 and a reservoir 776. Once fully inserted into the shell 722 through the bottom opening 734 (FIG. 16), the rear face 756 of the insert 750 will be positioned adjacent the front surface 704 of the shroud 708. An electric heating element 710 is positioned behind the front surface 704 and the light source 714 is positioned between the rear face 756 of the insert 750 and the front surface 704 of the shroud 708.

To prepare the insect trapping device 100 for operation, the shell 722 with the seated insert 750 can be coupled to the base 702 by a user. As a result of the coupling, the electrical contacts 740A-D will make contact with the respective electrical contacts 742A-D of the base 702. Depending on the structure of the insert 750, the base may include a cavity 720 that is sized to receive at least a portion of the reservoir 776. Similar to previously described configurations, the insert 750 can optionally include a downwardly depending tab 764 that is positioned to engage a switch in the base 702. In such configurations, for instance, power will only be delivered to the electric heating element 710 and the light source 714 when the shell 722 is engaged to the base 702 and the switch is also activated by the downwardly depending tab 764. In this way, the electric heating element 710 and the light source 714 will only be operational when the user has properly positioned the insert 750 within the shell 722 and attached the shell 722 to the base 702.

Subsequent to use of the insect trapping device 100, the user can decouple the cartridge 718 from the base 702. The insert 750 can be removed from the shell 722 by any suitable technique, such as by squeezing certain portions of the shell 722. The shroud 708, electric heating element 710 and the light source 714 remain retained within the shell 722 when the insert 750 is removed.

Figure 17:
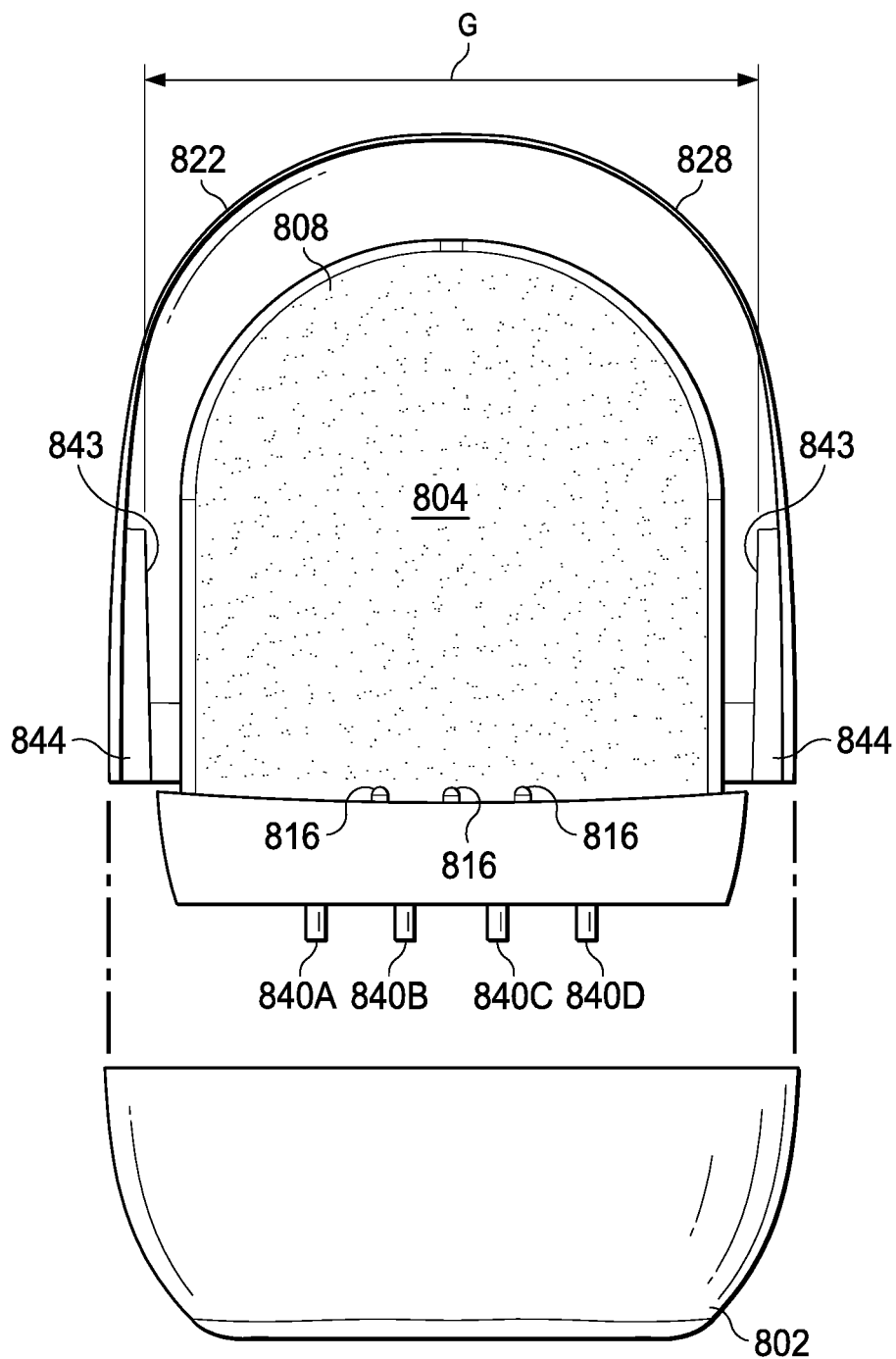
FIG. 17 shows an exploded front view of a shell with an associated base with the front housing of the shell not shown for illustration purposes.
Figure 18:
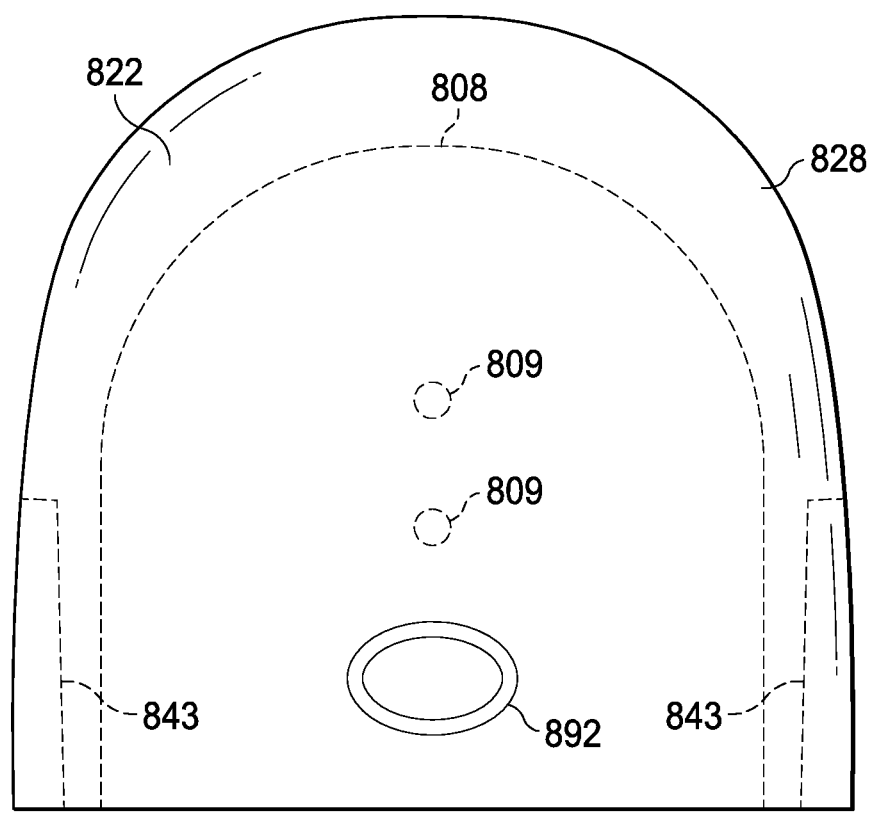
FIG. 18 shows a rear view of the shell of FIG. 17.

Referring now to FIGS. 17-18, another example configuration of a shell 822 is depicted. FIG. 17 shows an exploded front view of the shell 822 with an associated base 802. The front housing of the shell 822 is not shown for illustration purposes. FIG. 18 shows a rear view of the shell 822. The base 802 can be similar to the base 702 and include electrical contacts that are configured to receive the electrical contacts 840A-D of the shell 822. A shroud 808 is coupled to the rear housing 828 of the shell 822. In the illustrated configuration, two connection points 809 (FIG. 18) are used to couple the shroud 808 to the rear housing 828. As described in more detail below, these connection points 809 can help to facilitate the various flexing of the shell 822 during removal of an insert. The shroud 808 can house an electric heating element (not shown) that is configured to heat the front surface 804 of the shroud 808 during operation. Similar to other configurations, the front surface 804 of the shroud 808 can be concave and textured with LEDs 816, or other type of light source, mounted proximate to the front surface 804.

The shell 822 can also include opposing guide rails 844 extending at least partially along the inner surface of the shell 822. The inner surfaces 843 of the opposing guide rails 843 can form a gap having a width (G). The width (G) may be slightly narrower than the width of an insert, such that once an insert is slid into the shell 822, the guide rails 844 maintain the relative placement of the insert 822 via friction fit. Other techniques may be used to mechanically engage the insert with the shell 822. In order to release the insert from the shell 822, the shell 822 can be removed from the base 802 and a user can squeeze the front and/or rear surfaces of the shell 822 in order to deflect those portions inward. An example dimple 892 is shown on FIG. 18 as an example squeeze point on the rear housing 828. A similar dimple may be provided on the front housing of the shell 822. As those portions of the shell 822 deflect inward, the guide rails 843 will splay outward, thereby increasing the gap (G) and releasing the friction fit with the insert. It is noted, that the two connection points 809 of the shroud 808 to the rear housing 828 can help to facilitate the flexing of the shell 822 such that an insert can be release while also maintaining the shroud's 808 placement inside the shell 822.

Surface Temperatures Test Method

Surface temperatures of insect trapping devices are measured over three surface locations of the activated device in accordance with the following procedures. The temperature measurements are conducted using a calibrated thermocouple-based thermometer (such as the Fluke Model 51 Thermometer, as available from Fluke Corporation, Everett, Wash., U.S.A), wherein the thermocouple probe tip has a diameter of approximately 1 mm.

The three surface locations on the insect trapping device that are specified to be measured are namely the adhesive portion, the front surface of the shroud, and the front surface of the electric heating element (see FIGS. 1-13B). Each insect trapping device is measured under two different atmospheric conditions, namely at 23° C. +/−2° C. with a Relative Humidity of 20-60%RH; and at 30° C. +/−1° C. with a Relative Humidity of 20-60% RH. Measurements are conducted only while the insect trapping device is protected from air currents and drafts since air movements may affect the results. For the purposes of this test method, a steady state temperature is defined as a surface temperature that fluctuates within a range of +/−1° C. during a monitoring period of 5 minutes, as measured by the thermocouple placed in contact with the insect trapping device at the approximate center of the specified surface.

Figure 19:
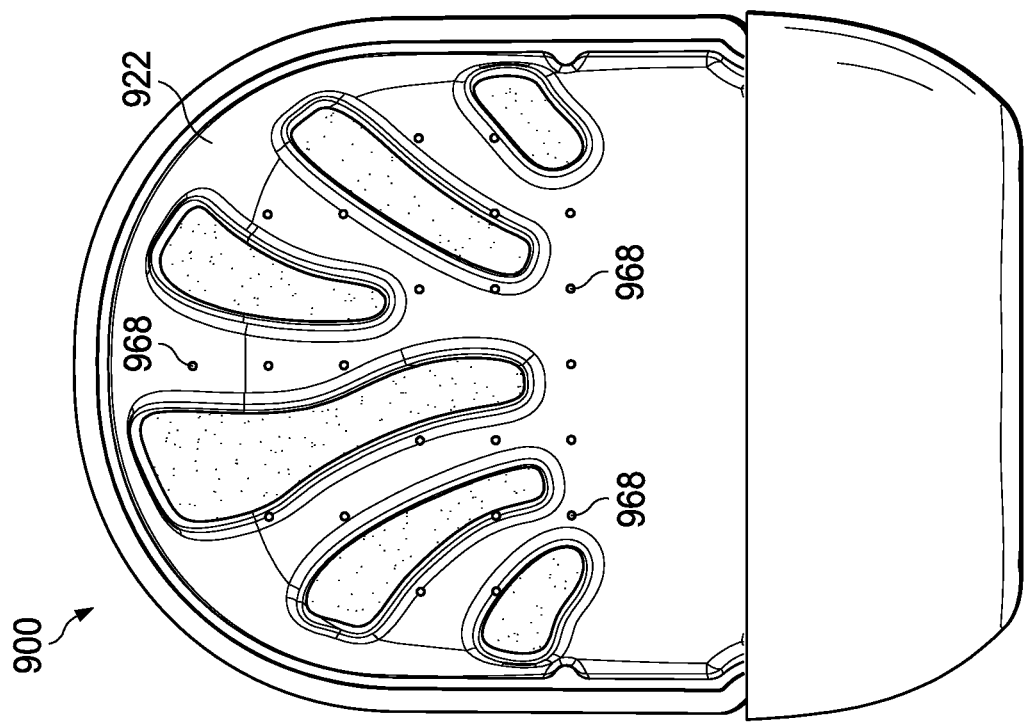
FIG. 19 depicts an example insect trapping device showing a shell subsequent to the drilling of holes at approximately 1 cm intervals.

Each insect trapping device to be tested is first prepared by placing it in the 23° C. atmospheric condition specified, and removing any release liners such as those which may be associated with the insert or cartridge. The cartridge loaded with the adhesive portion is loaded onto the insect trapping device according to any instructions provided by the manufacturer. If the openings in the outer shell of the insect trapping device are insufficient in size or location to enable easy access for the thermocouple probe tip to come in contact with the areas of the adhesive portion to be measured, then the outer shell of the device is modified to provide such access. The outer shell of the device may be removed if necessary, and such modifications are made using a sharp blade to gently puncture the shell to form a plurality of small perforating slits. Each perforation comprises a pair of overlapping orthogonal slits which together form an X-pattern cut through the thickness of the shell. The slits are of the minimum length necessary to permit the thermocouple probe tip to penetrate through the shell and contact the areas of the adhesive portion to be measured. The slits are arranged in a grid-pattern with approximately 1 cm intervals over the area of the adhesive portion to be measured that is not otherwise accessible by the thermocouple probe through the shell. If the thickness and/or strength of the shell prevents the cutting of such slits, then holes slightly larger than the probe tip diameter may be drilled through the shell instead of the slit perforations. The modified shell is remounted back onto the device. If adequate access to the adhesive portion cannot be provided by modifying the shell, then the shell may be removed to provide adequate access to the areas of the adhesive portion to be measured. For illustration purposes, FIG. 19 depicts an example insect trapping device 900 showing a shell 922 subsequent to the drilling of holes 968 at approximately 1 cm intervals.

The insect trapping device is activated by and attaching the cartridge to the base and supplying electrical power to the device at the appropriate voltage as specified on the device label, or as otherwise indicated. The device is then allowed to heat up for at least 30 minutes. After 30 minutes of heating, the thermocouple thermometer is used periodically to monitor the locations of the adhesive portion to be measured, and the device is allowed to continue warming until the monitored locations reach a steady state temperature. When a steady state temperature is detected, the device is ready for measurement of the reportable surface temperatures of the adhesive portion, at the 23° C. condition.

To measure the adhesive portion at the 23° C. condition, the surface temperature is measured repeatedly in a grid pattern, such that a measurement is taken within each approximate centimeter square of the surface of the exposed adhesive area that is heated. The average value of the grid-based measurements that is directly in front of the portion of the shroud that is heated is calculated (the Steady State Average Temperature), and both the minimum and maximum values of these grid-based measurements for: (i) the entire adhesive portion that is heated, whether or not directly in front of the shroud (the Minimum Steady State Temperature and the Maximum Steady State Temperature, respectively), and (ii) the adhesive portion directly in front of the shroud (the Direct Heat Minimum Steady State Temperature and Direct Heat Maximum Steady State Temperature, respectively) are also determined. The values of these three temperature metrics are reported for the adhesive portion at the 23° C. atmospheric condition.

The device is then located in the 30° C. atmospheric condition specified, activated with electrical power, and allowed to heat for at least 30 minutes and until the adhesive portion again reaches a steady state temperature. The thermocouple-based thermometer is also allowed to equilibrate under the same atmospheric condition. The adhesive portion is then measured again using the same grid-pattern technique and calculations that were used previously, in order to determine the values of the same three temperature metrics specified previously, except this time the results are obtained and reported at the 30° C. atmospheric condition.

Figure 20:
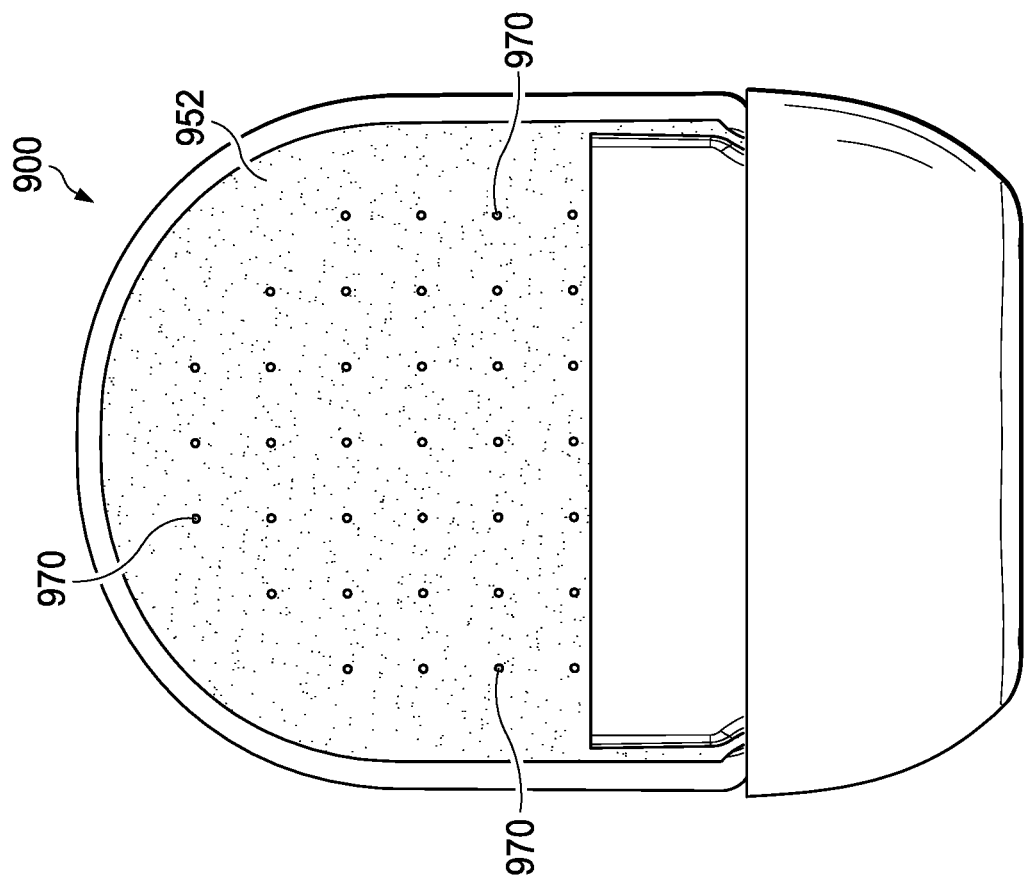
FIG. 20 depicts the insect trapping device of FIG. 19 showing an adhesive portion subsequent to the drilling of holes at approximately 1 cm intervals and prior to the re-attachment of the shell.

Before proceeding to measure the front surface of the shroud, the outer shell of the device is removed and set aside until the adhesive portion is modified as described below. If the shell cannot be temporarily removed, the front portion may be cut off in a manner that would enable it to be replaced after the required modifications of the adhesive portion. After the shell or front portion of the shell is temporarily removed, the adhesive portion is removed from the device and gently apertured with a plurality of slits or small holes in a manner similar to that described previously for the modification of the shell. Each aperture has a dimension of approximately 1 mm in diameter and is sufficient to permit the thermocouple probe to pass through the adhesive portion. Care is taken to ensure that the adhesive portion remains well attached to the supporting frame or mounts after the puncturing process. The holes are arranged across the glue sheet in a grid-pattern of approximately 1 cm intervals, at approximately the same locations which were measured previously when recording the temperatures of the adhesive portion. Each aperture should be placed in the glue sheet directly in front of the portion of the housing surface that is heated, and in alignment with the apertures of the shell after the shell is replaced. The apertured adhesive portion is reloaded into the device, and the outer shell or shell portion is replaced. For illustration purposes, FIG. 20 depicts the example insect trapping device 900 showing an adhesive portion 952 subsequent to the drilling of holes 970 at approximately 1 cm intervals and prior to the re-attachment of the shell.

The device with punctured adhesive portion is located in the 23° C. atmospheric condition specified, activated with electrical power, and allowed to heat for at least 30 minutes until the front surface of the shroud reaches a steady state temperature. The surface of the front surface of the shroud is then measured in a grid-pattern by passing the thermocouple through both the apertures in the shell (i.e., holes 968 in FIG. 19) and those in the adhesive portion (i.e., holes 970 in FIG. 20). The temperatures measured in the grid pattern are used to determine the values of the Steady State Average Temperature, the Minimum Steady State Temperature and the Maximum Steady State Temperature, except this time the results are obtained and reported from the front surface of the shroud, at the 23 ° C. atmospheric condition The device is then located in the 30° C. atmospheric condition specified, activated with electrical power, and allowed to heat for at least 30 minutes and until the front surface of the shroud again reaches a steady state temperature. The thermocouple-based thermometer is also allowed to equilibrate under the same atmospheric condition. The front surface of the shroud is then measured again using the same grid-pattern technique and calculations that were used previously, in order to determine the values of the same three temperature metrics specified previously, except this time the results are obtained and reported at the 30° C. atmospheric condition.

The various structural components of the device are disassembled and removed to provide direct access to all surfaces of the electric heating element while it remains functionally attached to the electronic circuit board which powers and controls the electric heating element. Additional care should be taken to ensure safety and prevent electrical shocks during this stage of the measurement process. The insect trapping device with the exposed and functional electric heating element is located in the 23° C. atmospheric condition specified, activated with electrical power, and allowed to heat for at least 30 minutes and until the front surface of the electric heating element reaches a steady state temperature. The surface temperature of the front surface of the electric heating element is measured with the thermocouple in one single location, namely at the approximate center of the surface of the face of the electric heating element. The temperature measurement obtained from the front surface of the electric heating element at the 23° C. atmospheric condition is reported as the set point temperature (Ts) of the device.

EXAMPLES

The following examples are given solely for the purpose of illustration and are not to be construed as limitations of the invention as many variations are possible without departing from the spirit and the scope of the invention.

1. Example #1

Figure 21:
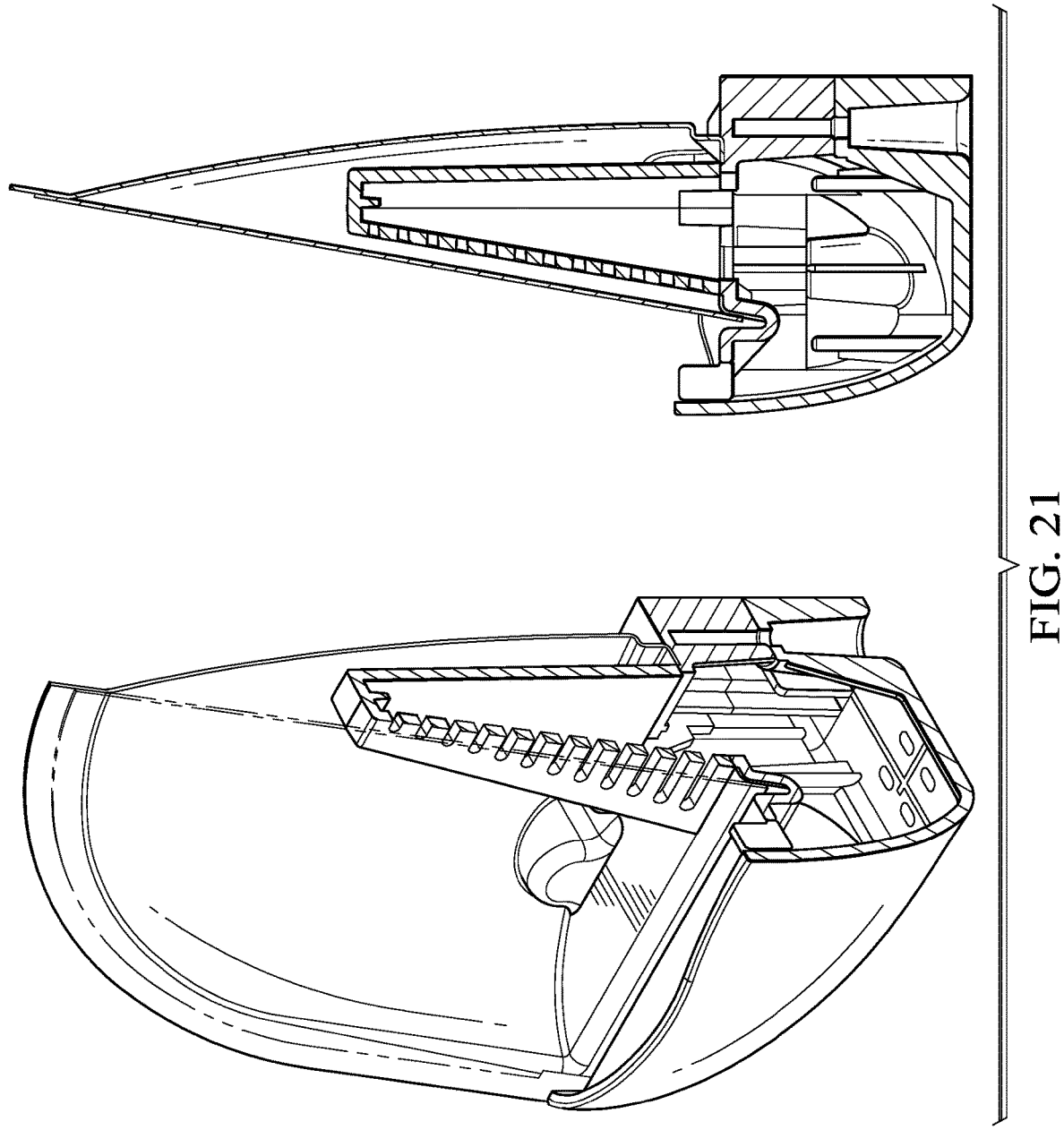
FIG. 21 is a perspective view of an insect trapping device having a heated, vented housing with a circuit board therein containing resistive heating diodes and two light emitting diodes (LEDs)
Figure 22:
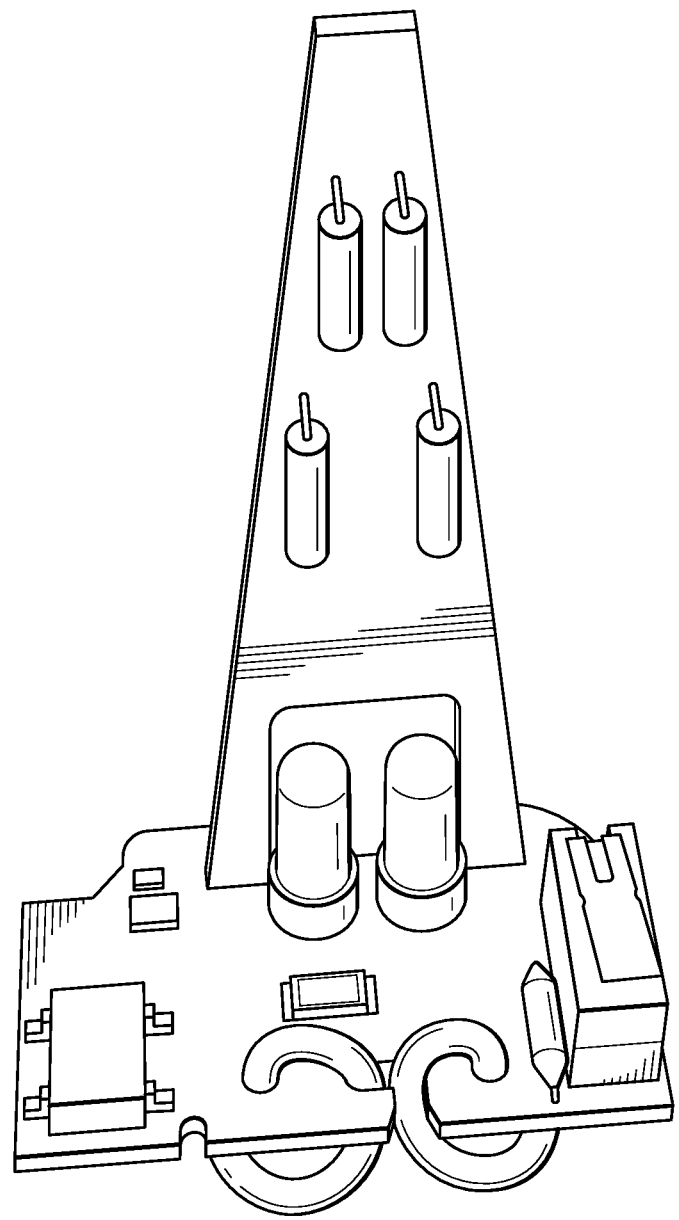
FIG. 22 is a front plan view of the circuit board described with respect to FIG. 21.
Figure 24:
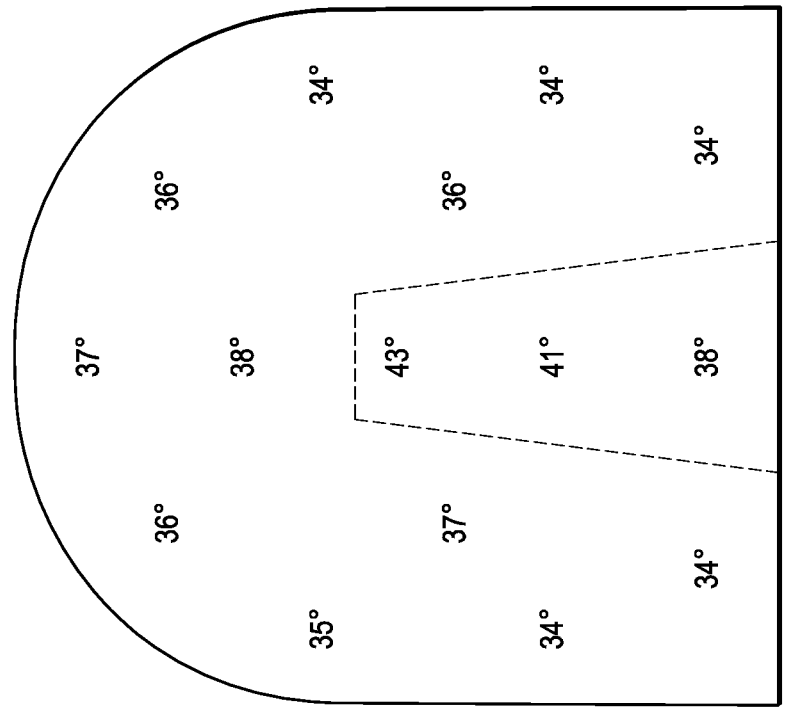
FIG. 24 depicts another heat map for the front face of the adhesive portion generated from the device of FIGS. 21 and 22.
Figure 23:
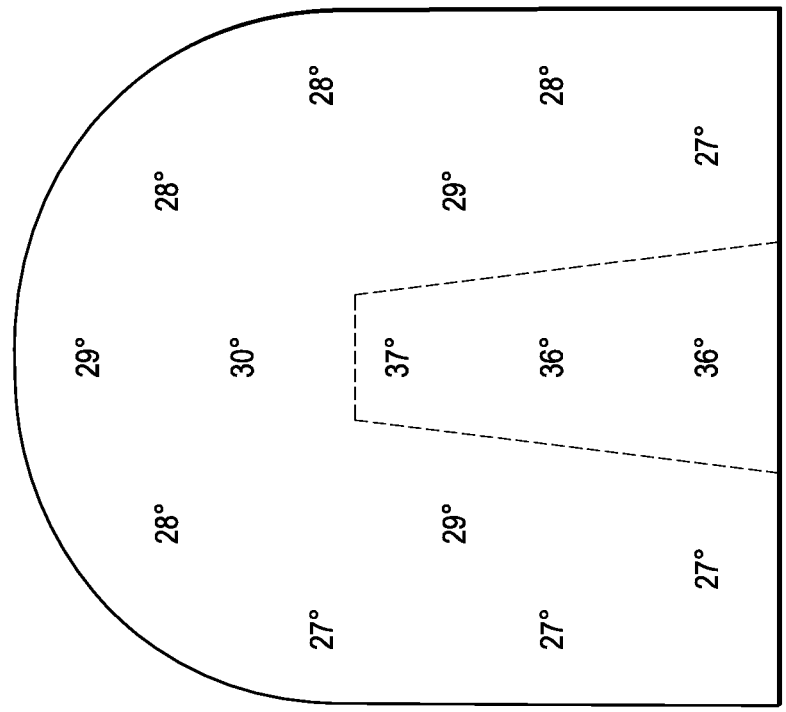
FIG. 23 depicts a heat map for the front face of the adhesive portion generated from the device of FIGS. 21 and 22.

FIGS. 21 and 22 illustrate an example of a base with an upstanding, vented housing containing therein a circuit board with four resistive heating elements and two LEDs. Each of the four resistors was a 3.3 kΩ resistor. This particular design had a front surface area of the upstanding, vented housing (including that of the vents) of about 6.5 cm$^2$ compared to a about 58.5 cm$^2$ surface area of the rear face of the glue sheet. A cartridge was adapted to engage the base so that the upstanding, vented housing is disposed adjacent the rear face to the glue sheet when the cartridge engaged the base. FIG. 23 illustrates the measured temperatures of the front face of the glue sheet at twelve points at ambient conditions of about 22° C. and about 50% relative humidity. FIG. 24 illustrates the temperatures of the front face of the glue sheet at twelve points at ambient conditions of about 31° C. and about 50% relative humidity. The outline of the shroud is shown in FIGS. 23 and 24 within the interior of the outline of the adhesive portion. All temperature measurements were taken after 1.5 hours of operation and at steady state conditions. The Steady State Average Temperature was 30° C. in FIGS. 23 and 37° C. in FIG. 24. The Maximum Steady State Temperature was 37.2° C. in FIGS. 23 and 43.3° C. in FIG. 24. The Heat Minimum Steady State Temperature was 26.6° C. in FIGS. 23 and 33.8° C. in FIG. 24. The Direct Heat Maximum Steady State Temperature was 37.2° C. in FIGS. 23 and 43.3° C. in FIG. 24. Direct Heat Minimum Steady State Temperature was 35.5° C. in FIGS. 23 and 38.3° C. in FIG. 24. This Example illustrates a large drop-off in temperature beyond the outline of the shroud despite a higher Steady State Average Temperature than Example #2.

2. Example #2

Figure 25:
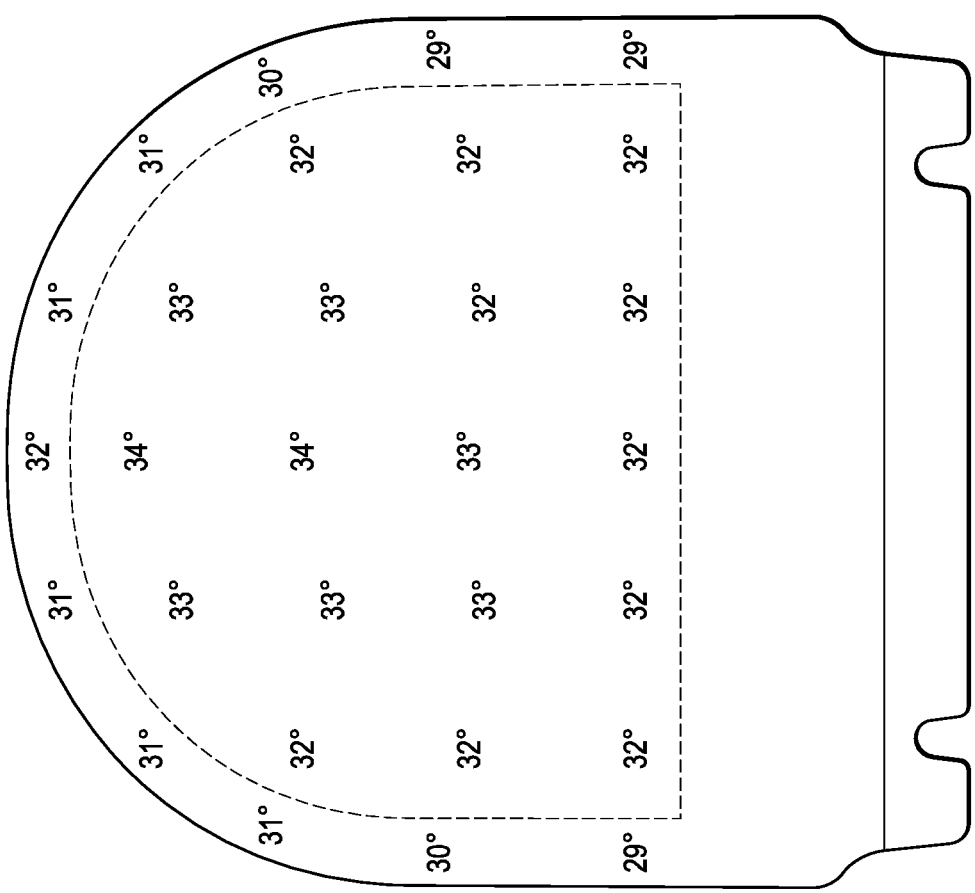
FIG. 25 depicts a heat map for the front face of an adhesive portion generated from a device similar to that shown in FIGS. 4 and 5.

A device similar to that shown in FIGS. 4 to 5 having a base with an upstanding housing containing therein a metal plate heated by a PTC thermistor, model number 15-6-0.3 manufactured by ShenZhen Jinke Special Materials Co., Ltd. was tested. This model of PTC thermistor has a target surface temperature of 60° C. +/−5° C. This particular design had a front surface area of the upstanding housing of 35 cm$^2$ compared to a 47 cm$^2$ surface area of the rear face of the glue sheet. A cartridge similar in design to that shown in FIG. 4 herein was adapted to engage the base so that the upstanding housing was disposed adjacent the rear face to the glue sheet when the cartridge engaged the base. FIG. 25 illustrates the temperatures of the front face of the glue sheet at 29 points at ambient conditions of about 22° C. and 50% relative humidity. The outline of the shroud is shown in FIG. 25 within the interior of the outline of the adhesive portion. All temperature measurements were taken after 1.5 hours of operation and at steady state conditions. The Steady State Average Temperature was 32.5° C. The Maximum Steady State Temperature was 34.4° C. The Heat Minimum Steady State Temperature was 28.9° C. The Direct Heat Maximum Steady State Temperature was 34.4° C. Direct Heat Minimum Steady State Temperature was 31.7° C. This Example illustrates a smaller drop-off in temperature beyond the outline of the shroud despite a lower Steady State Average Temperature than Example #1.

Further Non-Limiting Description of the Disclosure

The following numbered paragraphs constitute a further non-limiting description of the disclosure in a form suitable for appending to the claim section if later desired.

1. An insect trapping device, comprising:
a base comprising an upstanding electric heating element;
a cartridge releaseably engaging the base, the cartridge having a front surface defining an opening for receiving a flying or crawling insect and a bottom opening through which the electric heating element passes when the cartridge engages the base, and the cartridge comprising an adhesive portion for trapping the insect; and
a light source disposed between the upstanding electric heating element and the adhesive portion when cartridge engages the base.

2. The insect trapping device of example 1, wherein the electric heating element comprises a PTC heating element, wherein the PTC heating element is in thermal contact with a metal plate.

3. The insect trapping device according to one of examples 1 or 2, further comprising a shroud at least partially surrounding the electric heating element.

4. The insect trapping device of example 3, wherein the shroud has a front surface heatable by the electric heating element, wherein the front surface is disposed adjacent the adhesive portion when the cartridge engages the base and wherein the front surface reaches a steady state average temperature in less than 1 hour when heated by the electric heating element.

5. The insect trapping device of example 4, wherein the steady state average temperature of the front surface of the shroud is between about 40° C. and about 50° C. at an ambient temperature of 23° C.

6. The insect trapping device of example 5, wherein the front surface of the shroud has minimum and maximum steady state temperatures within +/−6, 8, 10, or 12° C. of the steady state average temperature at an ambient temperature of 23° C.

7. The insect trapping device according to any of the preceding examples, wherein the adhesive portion has a steady state average temperature between about 32° C. and about 38° C. at an ambient temperature of 23° C.

8. The insect trapping device according to any of the preceding examples, wherein the adhesive portion has a steady state average temperature between about 35° C. and about 40.5° C. at an ambient temperature of 30° C.

9. The insect trapping device according to any one of examples 7 or 8, wherein the adhesive portion has minimum direct heat and maximum direct heat steady state temperatures within +/−1.5° C., 2.5° C., or 3.5° C. of the steady state average temperatures.

10. The insect trapping device according to any of the preceding examples, wherein the electric heating element comprises PTC heating element, wherein the PTC heating element is in thermal contact with a metal plate.

11. The insect trapping device according to example 10, wherein the PTC heating element has a set point temperature (Ts) between about 50° C. and about 70° C.

12. The insect trapping device according to any one of examples 10 or 11, wherein the metal plate has a thickness from about 0.25 mm to about 1.5 mm.

13. The insect trapping device according to any of examples 10 to 12, wherein the metal plate is made from aluminum.

14. The insect trapping device according to any of examples 10 to 13, wherein the metal plate has a width greater than 5 cm.

15. The insect trapping device according to any of examples 10 to 14, wherein the metal plate has a surface area between about 23 cm$^2$ and about 148 cm$_2$.

16. The insect trapping device according to any of examples 4 to 15, wherein the front surface of the shroud is concave.

17. The insect trapping according to any of the preceding examples, wherein side edges of the shroud are closer to the adhesive portion than a geometric center of the shroud is to the adhesive portion when the cartridge engages the base.

18. The insect trapping device of example 17, wherein a gap between the side edges of the shroud and the adhesive portion is between about 0.5 mm and about 3 mm.

19. The insect trapping device according to one of examples 17 or 18, wherein the gap between the geometric center of the shroud and the adhesive portion is between about 4 mm and about 12 mm.

20. The insect trapping device according to any of the preceding examples, wherein the light source comprises one or more LEDs that each have a diameter between about 3 mm and about 5 mm.

21. The insect trapping device according to any of examples 4 to 20, wherein the light source is disposed between the front surface of the shroud and a rear face of the adhesive portion.

22. The insect trapping device according to any of examples 4 to 21, wherein a portion of the front surface of the shroud is roughened.

23. The insect trapping device of example 22, wherein the portion of the front surface of the shroud that is roughened has a surface roughness (Ra) from about SPI A-1 to about SPI D-3.

24. The insect trapping device according to example 23, wherein the portion of the front surface of the shroud that is roughened has a surface area that is between about 70% to about 100% of the surface area of the front surface of the shroud.

25. The insect trapping device according to any of the preceding examples, wherein the cartridge further comprises a reservoir to store an insect attracting composition.

26. The insect trapping device of example 25, wherein the reservoir is defined by a curved front wall and a substantially planar rear wall.

27. The insect trapping device according to one of examples 25 or 26, wherein the reservoir extends into the base when the cartridge engages the base.

28. The insect trapping device according to one of examples 25 to 27, wherein the adhesive portion extends into the reservoir.

29. The insect trapping device according to one of examples 25 to 28, wherein reservoir further defines an opening disposed between the insect attracting composition and the adhesive portion.

30. The insect trapping device according to one of examples 25 to 29, wherein the reservoir has a depth between about 0.2 cm and about 4 cm.

31. The insect trapping device according to one of examples 25 to 30, wherein the base further comprises a circuit board disposed behind the reservoir when the cartridge engages the base.

32. The insect trapping device according to any of the preceding examples, wherein the cartridge further comprises a downwardly depending tab that engages a switch in the base when the cartridge engages the base.

33. The insect trapping device according to any of the preceding examples, wherein the adhesive portion has a surface area from about 25 $cm^2$ to about 150 $cm^2$.

34. The insect trapping device according to any of the preceding examples, wherein the base further comprises prongs insertable into an electric socket for providing power to the base.

35. The insect trapping device according to any of the preceding examples, wherein the base comprises the light source.

36. The insect trapping device according to any of the preceding examples, wherein the cartridge comprises the light source.

37. The insect trapping device according to example 36, wherein the base comprises a contact for providing power to the light source when the cartridge engages the base.

38. An insect trapping device, comprising:
a base;
a cartridge comprising a shell and an insert having an adhesive portion, the cartridge releaseably engaging the base and the insert releaseably retained at least partially within the shell, the shell comprising a shroud having disposed therein an electric heating element; and
a light source positioned to illuminate at least a portion of the front surface of the shroud and at least a portion of the rear face of the adhesive portion when the insert is seated within the shell.

39. An insect trapping device according to example 38, wherein the base comprises a plurality of electrical contacts and the cartridge comprises a plurality of electrical contacts, wherein the plurality of electrical contacts of the base engage the plurality of electrical contracts of the cartridge to power the light source and the electric heating element.

40. An insect trapping device according to example 39, wherein the plurality of electrical contacts of the base comprises four electrical contacts and the plurality of electrical contacts of the cartridge comprises four electrical contacts.

41. An insect trapping device according to any one of examples 38 to 40, wherein the shell defines an opening in the bottom and wherein at least a portion of the insert passes through the opening in the bottom when inserting the insert into the shell.

42. An insect trapping device according to any one of examples 38 to 41, wherein when the cartridge is detached from the base, the insert drops out of the shell through the opening in the bottom in response to a user applying an inwardly directed force to a surface of the shell.

43. An insect trapping device according to example 42, wherein the force is applied by a hand.

44. An insect trapping device according to any one of examples 38 to 43, wherein the shroud and light source are an assembly that is retained within the shell.

45. An insect trapping device according to any one of examples 38 to 44, wherein the insert further comprises a frame at least partially surrounding the adhesive portion.

46. An insect trapping device according to any one of examples 38 to 45, wherein the insert further comprises a reservoir storing an insect attracting composition.

47. An insect trapping cartridge, comprising:
a shell comprising a front surface defining an opening for receiving a flying or crawling insect, a rear surface, a top surface, side surfaces and an opening in a bottom of the shell;
an insert having an adhesive portion, the insert releaseably retained at least partially within the shell, the shell comprising a shroud having disposed therein an electric heating element; and
wherein the insert drops out of the shell through the opening in the bottom in response to a user applying a force to one or more of the front surface, the rear surface, the top surface or one or more of the side surfaces.

48. An insect trapping device, comprising:
a base comprising an upstanding shroud having a front surface, the shroud having disposed therein an electric heating element for heating the front surface of the shroud;
a cartridge releaseably engaging the base, the cartridge defining an opening for receiving a flying or crawling insect and a bottom opening through which the shroud passes when the cartridge engages the base, and the cartridge comprising an adhesive portion for trapping the insect, the adhesive portion having a front face and a rear face, wherein side edges of the shroud are closer to the adhesive portion than a geometric center of the shroud is to the adhesive portion when the cartridge engages the base; and a light source positioned to illuminate at least a portion of the front surface of the shroud and at least a portion of the rear face of the adhesive portion when the cartridge engages the base.

49. The insect trapping device of example 48, wherein the front surface is heatable by the electric heating element, wherein the front surface is disposed adjacent the adhesive portion when the cartridge engages the base, and wherein the front surface reaches a steady state average temperature in less than 1 hour when heated by the electric heating element.

50. The insect trapping device of example 49, wherein the steady state average temperature of the front surface of the shroud is between about 40° C. and about 50° C. at an ambient temperature of 23° C.

51. The insect trapping device of example 50, wherein the front surface of the shroud has minimum and maximum steady state temperatures within +/−6, 8, 10, or 12° C. of the steady state average temperature at an ambient temperature of 23° C.

52. The insect trapping device according to any one of examples 48 to 51, wherein the adhesive portion has a steady state average temperature between about 32° C. and about 38° C. at an ambient temperature of 23° C.

53. The insect trapping device according to any one of examples 48 to 52, wherein the adhesive portion has a steady state average temperature between about 35° C. and about 40.5° C. at an ambient temperature of 30° C.

54. The insect trapping device according to any one of examples 52 or 53, wherein the adhesive portion has minimum direct heat and maximum direct heat steady state temperatures within +/−1.5° C., 2.5° C., or 3.5° C. of the steady state average temperatures.

55. The insect trapping device according to any one of examples 48 to 54, wherein the electric heating element a PTC heating element, wherein the PTC heating element is in thermal contact with a metal plate.

56. The insect trapping device according to example 55, wherein the PTC heating element has a set point temperature (Ts) between about 50 ° C. and about 70° C.

57. The insect trapping device according to any one of examples 55 or 56, wherein the metal plate has a thickness from about 0.25 mm to about 1.5 mm.

58. The insect trapping device according to any of examples 55 to 57, wherein the metal plate is made from aluminum.

59. The insect trapping device according to any of examples 55 to 58, wherein the metal plate has a width greater than 5 cm.

60. The insect trapping device according to any of examples 55 to 59, wherein the metal plate has a surface area between about 23 cm2 and about 148 cm2.

61. The insect trapping device according to any of any one of the preceding examples, wherein the front surface of the shroud is concave.

62. The insect trapping device according to any one of examples 48 to 61, wherein a gap between the side edges of the shroud and the adhesive portion is between about 0.5 mm and about 3 mm.

63. The insect trapping device according to any one of examples 48 to 62, wherein the gap between the geometric center of the shroud and the adhesive portion is between about 4 mm and about 12 mm.

64. The insect trapping device according to any one of examples 48 to 63, wherein the light source comprises one or more LEDs that each have a diameter between about 0.5 mm and about 10 mm.

65. The insect trapping device according to any one of examples 48 to 64, wherein the light source is disposed between the front surface of the shroud and a rear face of the adhesive portion.

66. The insect trapping device according to any one of examples 38 to 65, wherein a portion of the front surface of the shroud is roughened.

67. The insect trapping device of example 66, wherein the portion of the front surface of the shroud that is roughened has a surface roughness (Ra) from about SPI A-1 to about SPI D-3.

68. The insect trapping device according to example 67, wherein the portion of the front surface of the shroud that is roughened has a surface area that is between about 70% to about 100% of the surface area of the front surface of the shroud.

69. The insect trapping device according to any one of examples 48 to 68, wherein the cartridge further comprises a reservoir to store an insect attracting composition.

70. The insect trapping device of example 69, wherein the reservoir is defined by a curved front wall and a substantially planar rear wall.

71. The insect trapping device according to one of examples 69 or 70, wherein the reservoir extends into the base when the cartridge engages the base.

72. The insect trapping device according to one of examples 69 to 71, wherein the adhesive portion extends into the reservoir.

73. The insect trapping device according to one of examples 69 to 72, wherein the reservoir further defines an opening disposed between the insect attracting composition and the adhesive portion.

74. The insect trapping device according to one of examples 69 to 73, wherein the reservoir has a depth between about 0.2 cm and about 4 cm.

75. The insect trapping device according to one of examples 69 to 74, wherein the base further comprises a circuit board disposed behind the reservoir when the cartridge engages the base.

76. The insect trapping device according to any one of examples 48 to 75, wherein the cartridge further comprises a downwardly depending tab that engages a switch in the base when the cartridge engages the base.

77. The insect trapping device according to any one of examples 48 to 76, wherein the adhesive portion has a surface area from about 25 cm$^2$ to about 150 cm$^2$.

78. The insect trapping device according to any one of examples 48 to 77, wherein the base further comprises prongs insertable into an electric socket for providing power to the base.

79. The insect trapping device according to any one of examples 48 to 78, wherein the base comprises the light source.

80. The insect trapping device according to any one of examples 48 to 79, wherein the cartridge comprises the light source.

81. The insect trapping device according to example 80, wherein the base comprises a contact for providing power to the light source when the cartridge engages the base.

82. An insect trapping device, comprising:
a base comprising an upstanding shroud having a front surface, the shroud having disposed therein an electric heating element for heating the front surface of the shroud;
a cartridge releaseably engaging the base, the cartridge defining an opening for receiving a flying or crawling insect and a bottom opening through which the shroud passes when the cartridge engages the base, and the cartridge comprising an adhesive portion for trapping the insect, the adhesive portion having a front face and a rear face; and a light source positioned to illuminate at least a portion of the front surface of the shroud and at least a portion of the rear face of the adhesive portion when the cartridge engages the base, wherein the light that illuminates the portion of the front surface of the shroud is reflected by the portion of the front surface onto the rear face of the adhesive portion.

83. An insect trapping device, comprising:

a base comprising an upstanding shroud having an internal cavity and a front surface, the shroud having an electric heating element disposed within the internal cavity for heating the front surface of the shroud;

a cartridge releaseably engaging the base, the cartridge defining an opening for receiving a flying or crawling insect and a bottom opening through which the shroud passes when the cartridge engages the base, and the cartridge comprising an adhesive portion for trapping the insect, the adhesive portion having a front face and a rear face; and a light source positioned external to the internal cavity to illuminate at least a portion of the front surface of the shroud and at least a portion of the rear face of the adhesive portion when the cartridge engages the base.

84. The insect trapping device according to any one of the preceding examples, wherein a surface area of the front surface of the shroud is 50%, 60%, 70%, 80%, 90% or more of a surface area of the rear face of the adhesive portion.

85. The insect trapping device according to any one of the preceding examples, wherein the light source is located near the bottom of the shroud.

86. The insect trapping device according to any of the preceding examples, wherein the light source is disposed within the base.

87. The insect trapping device according to any of the preceding examples, wherein the electric heating element is not a light source.

88. The insect trapping device according to any of the preceding examples, wherein the portion of the front surface of the shroud is opaque.

89. The insect trapping device according to any of the preceding examples, wherein the rear face of the adhesive portion is substantially planar.

90. The insect trapping device according to any of the preceding examples, wherein the electric heating element reaches a temperature between about 50° C. and 70° C. during use.

Any of examples 2 to 37 above may also modify or depend from examples 38, 47, 48, 82 and 83.

The dimensions and/or values disclosed herein are not to be understood as being strictly limited to the exact numerical dimension and/or values recited. Instead, unless otherwise specified, each such dimension and/or value is intended to mean both the recited dimension and/or value and a functionally equivalent range surrounding that dimension and/or value. For example, a dimension disclosed as "40 mm" is intended to mean "about 40 mm".

Every document cited herein, including any cross referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An insect trapping device, comprising:
a base comprising a light source and an upstanding shroud having a front surface, the shroud having disposed therein an electric heating element for heating the front surface of the shroud; a cartridge releaseably engaging the base, the cartridge comprising a front housing defining an opening for receiving a flying or crawling insect, a rear housing, and an adhesive portion for trapping the insect, wherein the adhesive portion has a front face and a rear face and is positioned between the front housing and the rear housing, wherein the rear housing and the rear face of the adhesive portion define a bottom opening in the cartridge through which the shroud passes when the cartridge engages the base, wherein the light source is disposed between the front surface of the shroud and the rear face of the adhesive portion and produces light that illuminates at least a portion of the front surface of the shroud and at least a portion of the rear face of the adhesive portion, wherein at least a portion of the light illuminating the portion of the front surface is reflected by the front surface through the rear face of the adhesive portion.

2. The insect trapping device according to claim 1, wherein the front surface of the shroud is concave.

3. The insect trapping device according to claim 1, wherein side edges of the shroud are closer to the adhesive portion than a geometric center of the shroud is to the adhesive portion when the cartridge engages the base.

4. The insect trapping device according to claim 3, wherein a gap between the side edges of the shroud and the adhesive portion is between about 0.5 mm and about 3 mm.

5. The insect trapping device according to claim 1, wherein the gap between the geometric center of the shroud and the adhesive portion is between about 4 mm and about 12 mm.

6. The insect trapping device according to claim 1, wherein the light source comprises one or more LEDs that each have a diameter between about 0.5 mm and about 10 mm.

7. The insect trapping device according to claim 1, wherein the cartridge further comprises a downwardly depending tab that engages a switch in the base when the cartridge engages the base.

8. The insect trapping device according to claim 1, wherein the adhesive portion has a surface area from about 25 $cm^2$ to about 150 $cm^2$.

9. The insect trapping device according to claim 1, wherein the base further comprises prongs insertable into an electric socket for providing power to the base.

10. The insect trapping device according to claim 1, wherein the base comprises the light source.

11. The insect trapping device according to claim 1, wherein a surface area of the front surface of the shroud is at least 50%, of a surface area of the rear face of the adhesive portion.

12. The insect trapping device according to claim 1, wherein the rear face of the adhesive portion is substantially planar.

\* \* \* \* \*